US009846490B2

(12) United States Patent
Jung et al.

(10) Patent No.: US 9,846,490 B2
(45) Date of Patent: Dec. 19, 2017

(54) METHOD OF EXECUTING APPLICATION, METHOD OF CONTROLLING CONTENT SHARING, AND DISPLAY DEVICE

(71) Applicant: SAMSUNG ELECTRONICS CO., LTD., Suwon-si (KR)

(72) Inventors: Ji-hyun Jung, Seongnam-si (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 14/018,995

(22) Filed: Sep. 5, 2013

(65) Prior Publication Data

US 2014/0071043 A1    Mar. 13, 2014

(30) Foreign Application Priority Data

Sep. 7, 2012 (KR) .................. 10-2012-0099463

(51) Int. Cl.
  *G06F 3/03* (2006.01)
  *G06F 3/0482* (2013.01)
  *G06F 1/16* (2006.01)

(52) U.S. Cl.
  CPC .............. *G06F 3/03* (2013.01); *G06F 1/1652* (2013.01); *G06F 3/0482* (2013.01); *G06F 2203/04102* (2013.01)

(58) Field of Classification Search
  CPC combination set(s) only.
  See application file for complete search history.

(56) References Cited

U.S. PATENT DOCUMENTS

| | | | |
|---|---|---|---|
| 6,297,838 B1 * | 10/2001 | Chang et al. | 715/863 |
| 8,581,859 B2 | 11/2013 | Okumura et al. | |
| 2004/0008191 A1 | 1/2004 | Poupyrev et al. | |
| 2009/0085866 A1 | 4/2009 | Sugahara | |
| 2010/0011291 A1 * | 1/2010 | Nurmi | G06F 3/0414 715/702 |
| 2010/0056223 A1 | 3/2010 | Choi et al. | |
| 2010/0060548 A1 | 3/2010 | Choi et al. | |
| 2010/0090991 A1 * | 4/2010 | Cohen et al. | 345/204 |

(Continued)

FOREIGN PATENT DOCUMENTS

| | | |
|---|---|---|
| CN | 101674361 A | 3/2010 |
| CN | 101782804 A | 7/2010 |

(Continued)

OTHER PUBLICATIONS

International Search Report (PCT/ISA/237), dated Dec. 17, 2013, issued by the International Searching Authority in counterpart International Patent Application No. PCT/KR2013/008082.

(Continued)

*Primary Examiner* — Robin J Mishler
(74) *Attorney, Agent, or Firm* — Sughrue Mion, PLLC

(57) ABSTRACT

Provided is a method of executing an application performed by a display device. The method includes detecting a first motion that bends the display device in a first direction to deform the display device into a first form, executing a first application, based on the first motion, detecting a second motion that bends the display device in a second direction to deform the display device into a second form, and executing a second application related to the first application, based on the second motion.

51 Claims, 34 Drawing Sheets

(56) References Cited

U.S. PATENT DOCUMENTS

| | | |
|---|---|---|
| 2010/0120470 A1 | 5/2010 | Kim et al. |
| 2010/0141605 A1 | 6/2010 | Kang et al. |
| 2011/0057873 A1 | 3/2011 | Geissler et al. |
| 2011/0193771 A1 | 8/2011 | Chronqvist |
| 2012/0139834 A1 | 6/2012 | Han et al. |
| 2012/0319960 A1* | 12/2012 | Kildal .................. G06F 3/0487 345/173 |
| 2013/0007301 A1* | 1/2013 | Jung et al. ........................ 710/5 |
| 2013/0057764 A1* | 3/2013 | Choi et al. .................... 348/563 |
| 2015/0128067 A1* | 5/2015 | Wong .................... G06F 3/0486 715/748 |

FOREIGN PATENT DOCUMENTS

| | | |
|---|---|---|
| CN | 1020893737 A | 6/2011 |
| CN | 102156567 A | 8/2011 |
| EP | 2 202 624 A2 | 6/2010 |
| WO | 2010004080 A1 | 1/2010 |

OTHER PUBLICATIONS

Written Opinion (PCT/ISA/237), dated Dec. 17, 2013, issued by the International Searching Authority in counterpart International Patent Application No. PCT/KR2013/008082.
Communication dated Jul. 20, 2016 issued by the European Patent Office in counterpart European Patent Application No. 13183444.2.
Byron Lahey et al "PaperPhone: Understanding the use of Bend Gestures in Mobile Devices with Flexible Electronic Paper Displays"; CHI 2011 Session: Flexible Grips & Gestures; May 7-12, 2011; XP055021265; pp. 1303-1312.
Communication dated Dec. 15, 2016, issued by the State Intellectual Property Office of the People's Republic of China in counterpart Chinese Patent Application No. 201380058315.5.

* cited by examiner

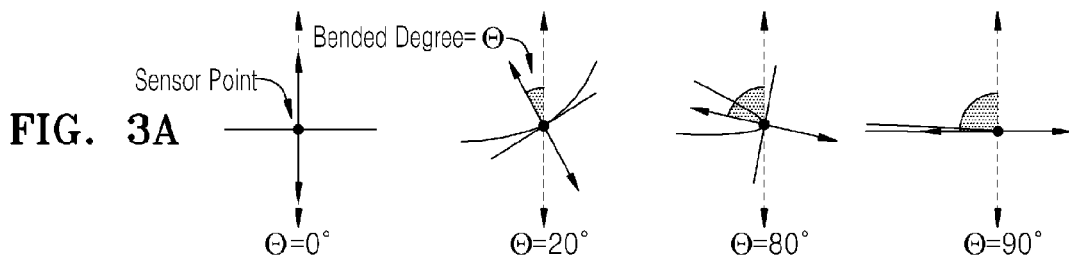
FIG. 3A
FIG. 3B
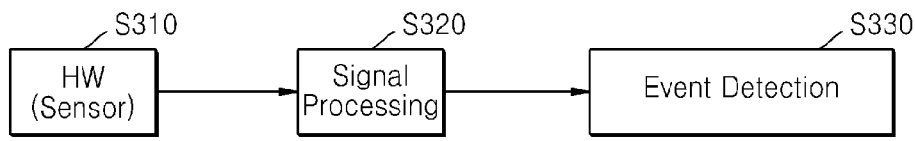
FIG. 3E
| Sensor | Degree |
|--------|--------|
| S1 | 0' |
| S2 | 10' |
| S3 | 15' |
| S4 | 15' |
| S5 | 3' |
| S6 | 0' |
| ... | ... |
| ... | ... |
Raw Data
| Sensor | Position | |
|--------|----------|---|
| (x1, y1) | (10,4,2) | |
| (x2, y2) | (11,14,2) | |
| (x3, y3) | (5,4,20) | |
| (x4, y4) | (16,4,12) | |
| (x5, y5) | (15,4,32) | |
| (x6, y6) | (11,5,22) | |
| ... | ... | |
| ... | ... | |
Processed Data
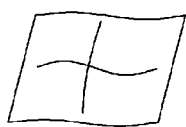
FIG. 3C
Raw Data
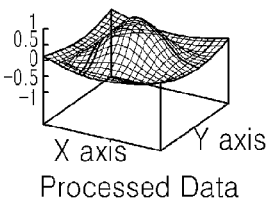
FIG. 3D
Processed Data
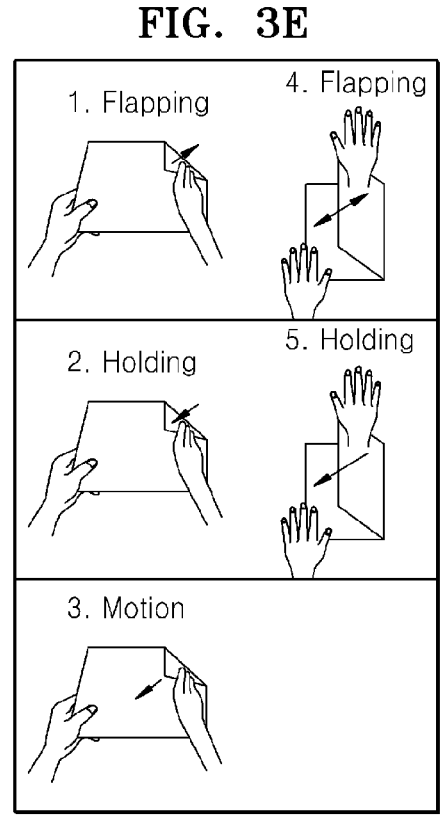

(BENDING IN + Z-AXIS DIRECTION : CONVEX)

(BENDING IN − Z-AXIS DIRECTION : CONCAVE)

(− Z-AXIS DIRECTION)

(− Z-AXIS DIRECTION)

(− Z-AXIS DIRECTION)

(− Z-AXIS DIRECTION)

(+ Z-AXIS DIRECTION)

(− Z-AXIS DIRECTION)

(− Z-AXIS DIRECTION)

(− Z-AXIS DIRECTION)

(− Z-AXIS DIRECTION)

(− Z-AXIS DIRECTION)

(− Z-AXIS DIRECTION)

(+ Z-AXIS DIRECTION)

(+ Z-AXIS DIRECTION)

(+ Z-AXIS DIRECTION)

(− Z-AXIS DIRECTION)

(+ Z-AXIS DIRECTION)

(+ Z-AXIS DIRECTION)

(− Z-AXIS DIRECTION)

(− Z-AXIS DIRECTION)

(− Z-AXIS DIRECTION)

(+ Z-AXIS DIRECTION)

(− Z-AXIS DIRECTION)

(+ Z-AXIS DIRECTION)

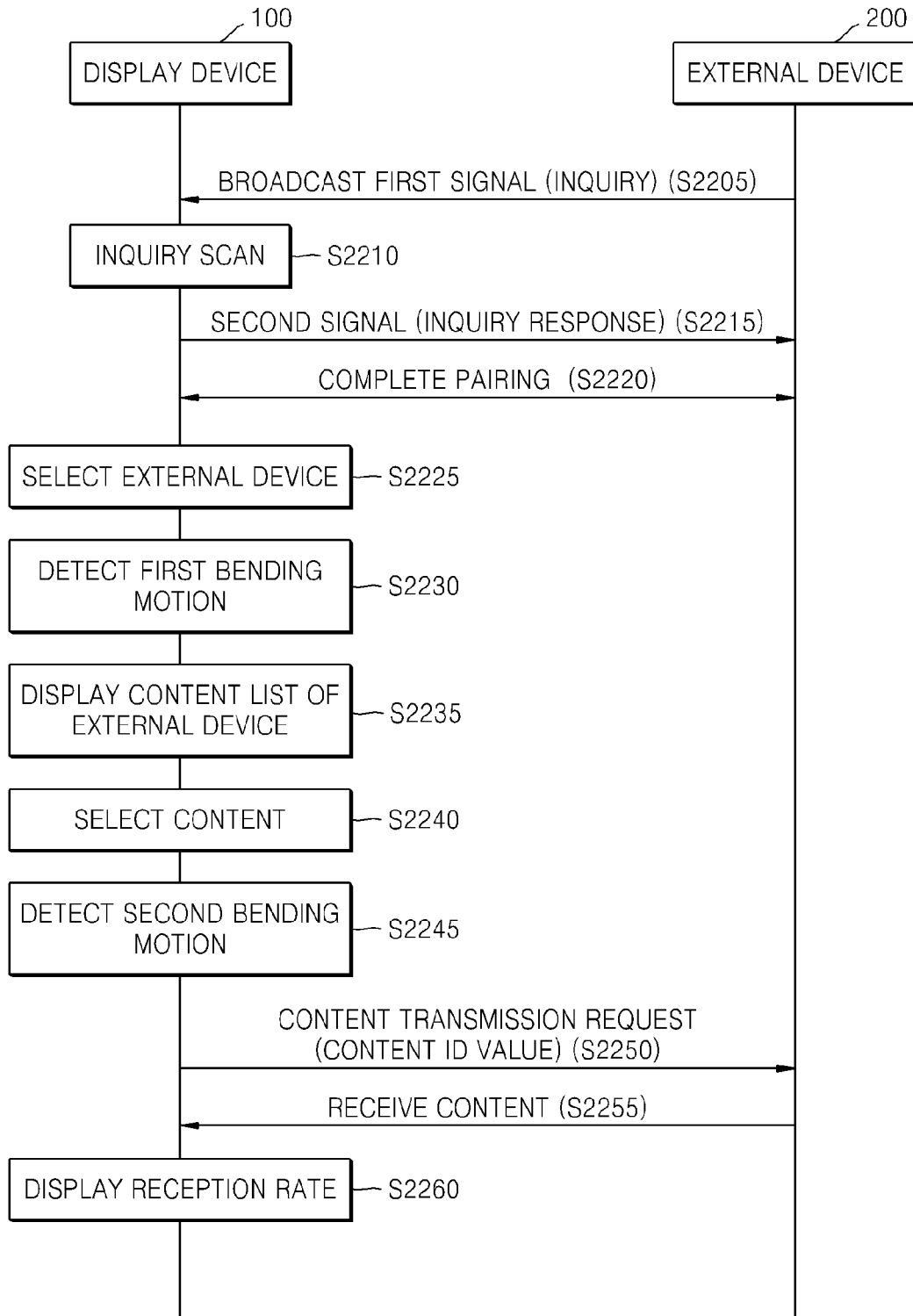

(− Z-AXIS DIRECTION)

(+ Z-AXIS DIRECTION)

(− Z-AXIS DIRECTION)

(+ Z-AXIS DIRECTION)

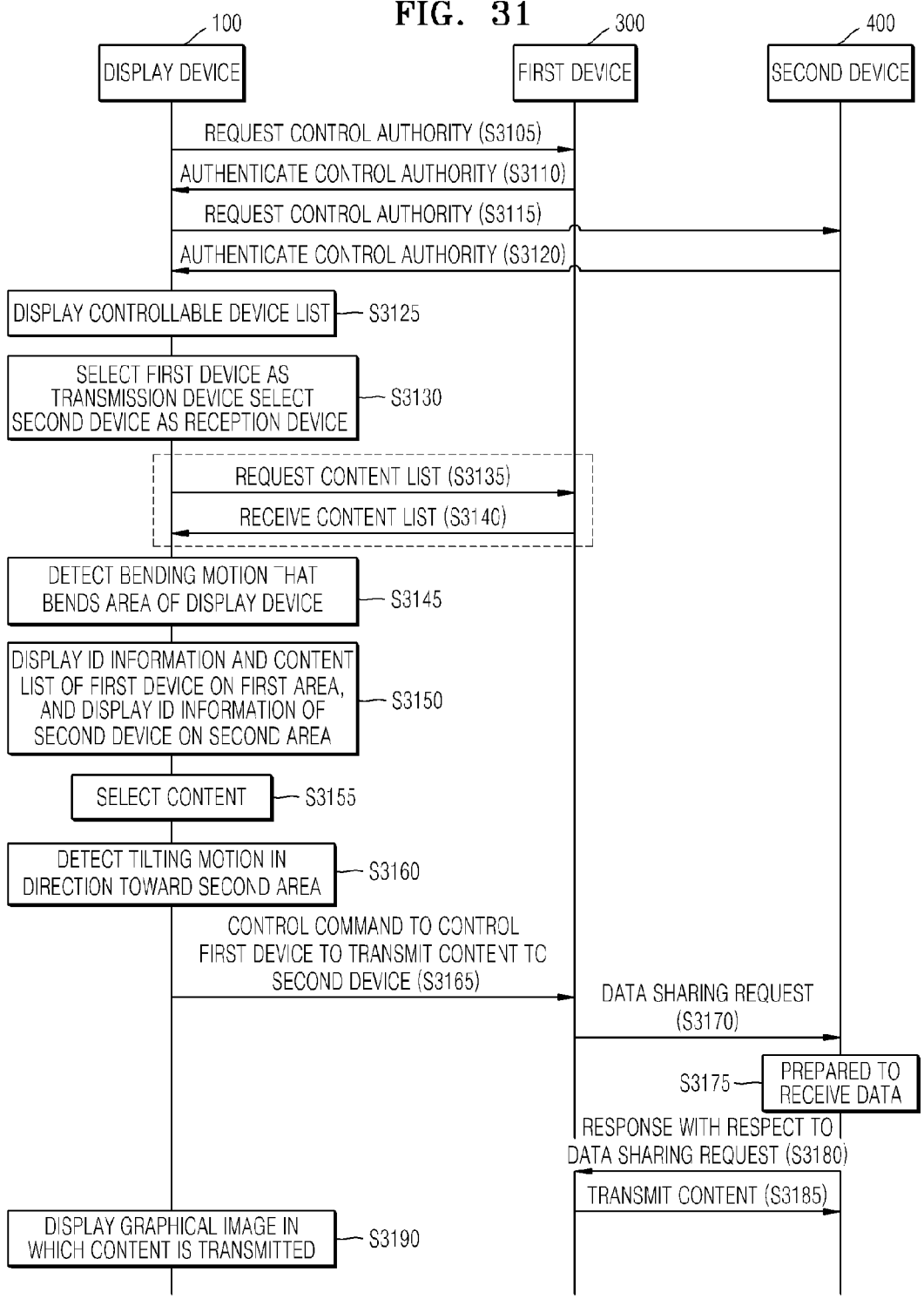

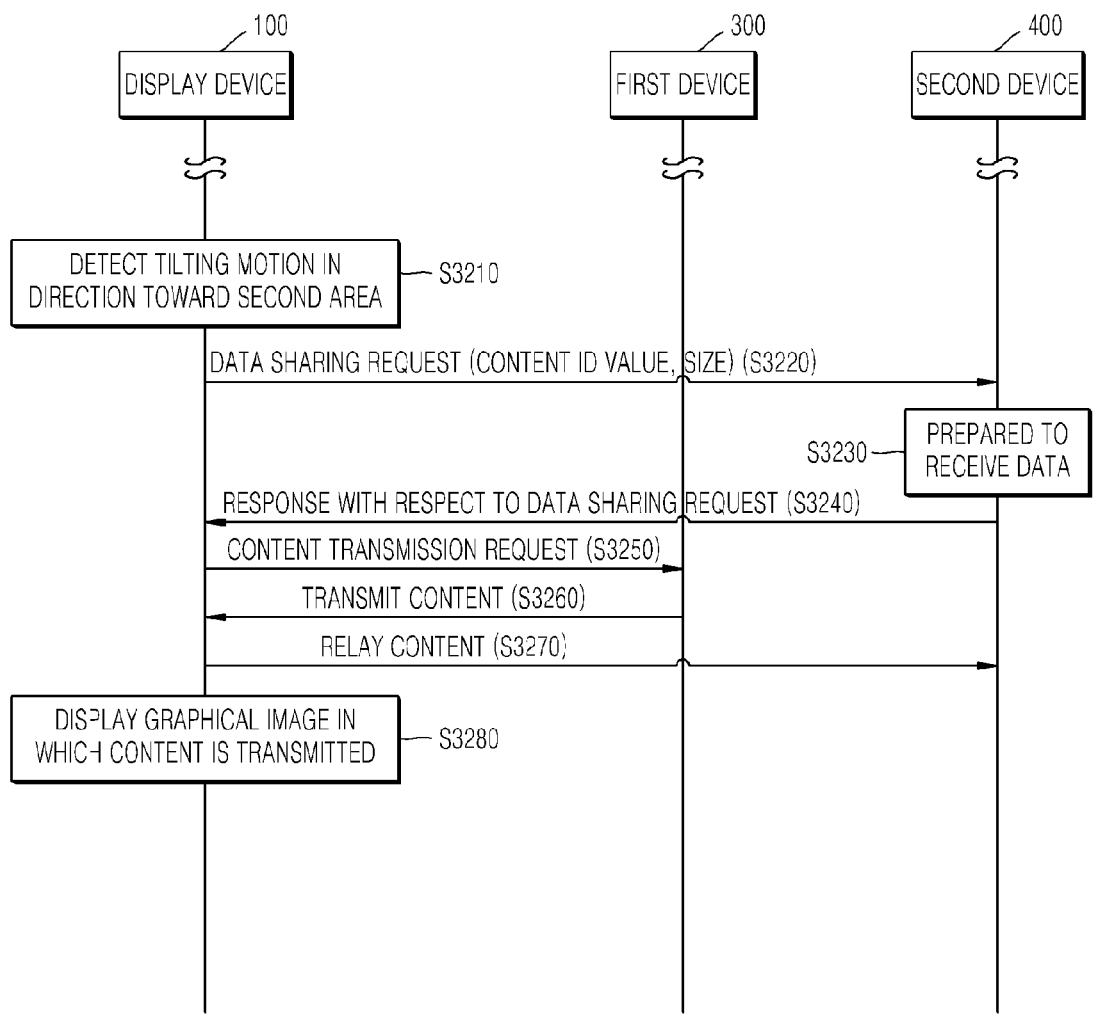

METHOD OF EXECUTING APPLICATION, METHOD OF CONTROLLING CONTENT SHARING, AND DISPLAY DEVICE

CROSS-REFERENCE TO RELATED PATENT APPLICATION

This application claims priority from Korean Patent Application No. 10-2012-0099463, filed in the Korean Intellectual Property Office on Sep. 7, 2012, the disclosure of which is incorporated herein by reference in its entirety.

BACKGROUND

1. Field

Apparatuses, devices, and methods consistent with exemplary embodiments relate to a display device for communicating with an external device by executing an application in response to a simple bending motion applied to the display device by a user, a method of executing the application, performed by the display device, a method of controlling content sharing between external devices, by detecting a simple bending motion applied to a display device by a user, and the display device that performs the method of controlling content sharing.

2. Description of the Related Art

As display-related technologies are developed, flexible displays, transparent display panels, or the like are being developed. A flexible display is a display device that can be bent.

The flexible display may be formed by replacing a glass substrate with a plastic film, wherein the glass substrate generally surrounds liquid crystals in a liquid crystal display (LCD) and an organic light-emitting display. The flexible display may have flexibility so that it may be folded and unfolded. Because the flexible display is formed by using a plastic substrate, a low-temperature manufacturing method, rather than a glass substrate manufacturing method, may be used to prevent a substrate from being damaged.

The flexible display may be thin, light weight, and shock-resistant. Also, the flexible display may be curved or bent and may be manufactured in various forms. In particular, the flexible display may be applied to industrial fields to which conventional glass-substrate displays are limitedly applied or cannot be applied.

For example, the flexible display may be applied to electronic books that may replace publications including magazines, textbooks, comic books, or the like, and new portable information technology (IT) products that include an ultra-small personal computer (PC) that may be carried while its display is folded or rolled, a smart card allowing real-time information confirmation, or the like. Because the flexible display is formed of a flexible plastic substrate, the applicable fields of the flexible display may be expanded to fashionable clothing and medical diagnosis.

Due to commercialization of flexible displays, there is increasing demand for a new type of user interface (UI) that allows a user to conveniently control an apparatus by using a flexible property of the flexible display.

SUMMARY

One or more exemplary embodiments provide a method of executing an application, a method of controlling content sharing, and a display device, whereby an intuitional user interface (UI) for exchanging content, connecting a phone-call, or backing up data is provided.

According to an aspect of an exemplary embodiment, there is provided a method of executing an application performed by a display device, the method including operations of detecting a first motion that bends the display device in a first direction to deform the display device into a first form; executing a first application, based on the first motion; detecting a second motion that bends the display device in a second direction to deform the display device into a second form; and executing a second application related to the first application, based on the second motion.

The second direction may be different from the first direction and the second form may be different from the first form.

The operation of executing the second application may include recommending and displaying the second application.

The operation of executing the second application may further include: providing a second application list including a plurality of second applications that are related to the first application; receiving a selection of at least one second application included in the second application list; and executing the at least one second application.

The operation of executing the first application may include: displaying an external device list on a screen of the display device using the first application; and receiving a selection of at least one external device included in the external device list. The operation of executing the second application may include: transmitting predetermined content to the at least one external device using the second application.

The operation of executing the second application may include: executing at least one of a message application, a chatting application, a social network service (SNS) application, and a short-distance communication application, so as to transmit the predetermined content to the at least one external device.

The operation of displaying the external device list may include: searching for one or more external devices that are positioned within a predetermined distance from the display device; and displaying a list of found one or more external devices on the screen.

The operation of displaying the external device list may include: displaying identification (ID) information of the at least one external device included in the external device list so that the ID information appears from an outer side of the screen toward an inner side of the screen, based on the first motion.

The operation of receiving the user selection may include: detecting a third motion that bends an area of the display device that is already deformed into the first form, by at least a predetermined degree into a bended position; and selecting an external device that corresponds to the bended position of the third motion.

The operation of receiving the user selection may include: receiving a user input that moves the ID information of the at least one external device included in the external device list to a center area of the screen.

The operation of receiving the user selection may include: detecting a tilting motion that tilts the display device that is already deformed into the first form, by at least a predetermined degree; and scrolling the ID information of the at least one external device included in the external device list, based on a tilting direction and a degree of tilt of the tilting motion.

The first form may include the display device being bent so that the screen is concave, and wherein the second form may include the display device being bent so that the screen is convex.

The operation of executing the first application may include selecting content to be transmitted to the at least one external device, based on a user input.

The user input may include at least one of a touch input, a bending input, a key input, a voice input, and a motion input.

The operation of transmitting the predetermined content may include changing a size of an image corresponding to the predetermined content, based on a transmission rate of the predetermined content, and then displaying the image on the screen.

The operation of displaying of the external device list may include changing an arrangement order in the external device list, based on a degree of bending of the first motion.

The operation of transmitting the predetermined content may include transmitting the predetermined content to an external device that is positioned at a top of the external device list, in response to the detecting the second motion.

The operation of executing the first application may include: displaying a content list of an external device on the screen using the first application; and receiving a user selection with respect to at least one content included in the content list, and wherein the executing the second application may include receiving the at least one content from the external device using the second application.

The operation of displaying the content list may include: receiving a first signal for content sharing from the external device that is positioned within a predetermined distance from the display device; transmitting a second signal including identification (ID) information of the display device to the external device, in response to the first signal; and receiving a content list from the external device via short-distance communication via a communication link formed between the display device and the external device based on the second signal.

The operation of receiving of the first signal may further include outputting an alarm signal when the first signal is received.

The alarm signal may include at least one of an audio signal, a video signal, and a vibration signal.

The operation of transmitting the second signal may include: determining whether a rear surface of the display device faces the external device; and transmitting the second signal to the external device based on a result of the determining.

The operation of receiving the user selection may include: detecting a third motion that bends, the display device that is already deformed into the first form, by at least a predetermined degree into a bended position; and selecting content that corresponds to the bended position of the third motion.

The operation of executing the first application may further include selecting the external device based on a user input.

The operation of selecting the external device may include: detecting a fourth motion that displays an external device list; and changing an arrangement order in the external device list, based on a degree of bending of the fourth motion.

The operation of executing the second application may include: changing a size of an image corresponding to the at least one content, based on a reception rate of the at least one content, and displaying the image with the changed size on the screen.

The operation of executing the first application may include: executing an address book application that displays an external device list on a screen of the display device based on the first motion; and receiving a user selection of at least one external device included in the external device list. The operation of executing the second application may include: executing a communication application that communicates with the at least one external device based on the second motion.

The operation of executing the first application may include: executing a content management application that displays a content list of an external device on a screen of the display device, based on the first motion; and receiving a user selection with respect to at least one content included in the content list. The operation of executing the second application may include: executing a backup application that backs up the at least one content in an external server based on the second motion.

According to an aspect of another exemplary embodiment, there is provided a method performed by a display device of controlling content sharing between a first device and a second device, the method including: detecting a motion that bends an area of the display device; displaying identification (ID) information and a content list of the first device on a first area of a screen of the display device and displaying ID information of the second device on a second area of the screen, based on the motion; receiving a selection of at least one content included in the content list that is displayed on the first area; detecting a tilting motion that tilts the display device by at least a predetermined degree in a direction toward the second area; controlling the first device to transmit the at least one content to the second device, based on the tilting motion; and displaying a graphical image on the screen, wherein the graphical image displays a motion in which an image that corresponds to the at least one content moves from the first area to the second area.

The method may further include: displaying a controllable device list on the screen; and selecting the first device in the controllable device list, as a transmission device, and selecting the second device in the controllable device list, as a reception device, according to a user input.

The operation of receiving the selection may include receiving the selection of the at least one content via at least one of a touch input, a bending input, a key input, and a voice input.

The operation of detecting the motion may include detecting the motion that bends the first area of the display device so as to make the first area become convex. The operation of displaying the content list of the first device may include displaying the content list of the first device extending from an upper portion of the first area toward a lower portion of the first area.

The operation of displaying the graphical image may include displaying a graphical image in which an image that corresponds to the at least one content falls from the convexly-bent first area to the second area, due to the tilting motion by at least the predetermined degree.

The operation of displaying the graphical image may include displaying a graphical image in which an image that corresponds to the at least one content falls from the first area to the concavely-bent second area in response to detecting a tilting motion that tilts the display device having a concavely-bent second area in a direction toward the second area by at least a predetermined degree.

The operation of controlling the first device may include transmitting a control command to the first device that controls the first device to transmit the at least one content to the second device.

The control command may include information about the at least one content and information about the second device.

The operation of controlling the first device may include: receiving the at least one content from the first device; and transmitting the at least one content to the second device.

According to an aspect of another exemplary embodiment, there is provided a display device for executing an application, the display device including: a user input unit configured to detect a first motion that bends the display device in a first direction to deform the display device into a first form, and detect a second motion that bends the display device in a second direction to deform the display device into a second form; and a control unit configured to execute a first application in response to the first motion being detected, and configured to execute a second application related to the first application in response to the second motion being detected.

The second direction may be different from the first direction and the second form may be different from the first form.

The control unit may be configured to determine the second application.

The display device may further include: a display unit configured to provide a second application list including a plurality of second applications that are related to the first application, wherein the user input unit may be configured to receive a selection of at least one second application included in the second application list, and wherein the control unit may be configured to execute the at least one second application.

The display device may further include: a display unit configured to display an external device list using the first application; and a communication unit configured to receive a user selection with respect to at least one external device included in the external device list, and transmit predetermined content to the at least one external device using the second application.

The control unit may be configured to execute at least one of a message application, a chatting application, a social network service (SNS) application, and a short-distance communication application so as to transmit the predetermined content to the at least one external device.

The display device may further include a searching unit configured to search for one or more external devices that are positioned within a predetermined distance from the display device, and wherein the display unit may be configured to display a list of the searched one or more external devices on the screen.

The display unit may be configured to display identification (ID) information of the at least one external device included in the external device list so that the ID information appears from an outer side of the screen toward an inner side of the screen is response to the first motion being detected.

The user input unit may be configured to detect a third motion that bends an area of the display device, that is already deformed into the first form, by at least a predetermined degree into a bended position, and the control unit may be configured to select an external device that corresponds to the bended position of the third motion.

The user input unit may be configured to receive a user input that moves the identification (ID) information of the at least one external device included in the external device list to a center area of the screen.

The user input unit may include a motion recognition module configured to detect a tilting motion that tilts the display device, that is already deformed into the first form, by at least a predetermined degree, and wherein the control unit may be configured to scroll the ID information of the at least one external device included in the external device list, based on a tilting direction and a degree of tilt of the tilting motion.

The first form may include a form in which a screen of the display device is bent to be concave, and wherein the second form may include a form in which a screen of the display device is bent to be convex.

The control unit may be configured to select content to be transmitted to the at least one external device based on a user input.

The user input may include at least one of a touch input, a bending input, a key input, a voice input, and a motion input.

The display unit may be configured to change a size of an image corresponding to the predetermined content, based on a transmission rate of the predetermined content, and then displays the image on the screen.

The control unit may be configured to change an arrangement order in the external device list, based on a degree of bending of the first motion.

The communication unit may be configured to transmit the predetermined content to an external device that is positioned at a top of the external device list, in response to the second motion being detected.

The display device may further including: a display unit configured to display a content list of an external device using the first application; and a communication unit configured to receive at least one content from the external device using the second application in response to receiving a user selection with respect to the at least one content included in the content list.

The communication unit may be configured to: receive a first signal for content sharing from the external device that is positioned within a predetermined distance from the display device; transmit a second signal including identification (ID) information of the display device to the external device, in response to the first signal; and receive a content list from the external device via short-distance communication via a communication link formed between the display device and the external device based on the second signal.

The display unit may be configured to output an alarm signal, when the first signal is received.

The control unit may be configured to: determine whether a rear surface of the display device faces the external device, and control the communication unit to transmit the second signal to the external device based on a result of the determination.

The user input unit may be configured to detect a third motion that bends the display device that is already deformed into the first form, by at least a predetermined degree into a bended position, and wherein the control unit may be configured to select content that corresponds to the bended position of the third motion.

The control unit may be configured to select the external device based on a user input.

The display unit may be configured to change a size of an image corresponding to the at least one content, based on a reception rate of the at least one content, and then displays the image on the screen.

The control unit may be configured to execute an address book application that displays an external device list on a screen of the display device is response to the control unit detecting the first motion, and wherein the control unit may be configured to execute a communication application that communicates with at least one user-selected external device included in the external device list in response to the control unit detecting the second motion.

The control unit may be configured to execute a content management application that displays a content list of an external device on a screen of the display device in response to the control unit detecting the first motion, and wherein the control unit may be configured to execute a backup application that backs up at least one user-selected content, that is included in the content list, in an external server in response to the control unit detecting the second motion.

BRIEF DESCRIPTION OF THE DRAWINGS

The above and other aspects will become more apparent by describing in detail exemplary embodiments with reference to the attached drawings in which:

FIGS. 3A through 3E illustrate a method of detecting a bending motion, according to an exemplary embodiment;

FIG. 22 is a flowchart of a method of receiving content, according to an exemplary embodiment;

FIG. 31 is a flowchart of a method of controlling content sharing, according to another exemplary embodiment; and FIG. 32 is a flowchart of a method of controlling content sharing, according to another exemplary embodiment.

DETAILED DESCRIPTION

Figure 1:
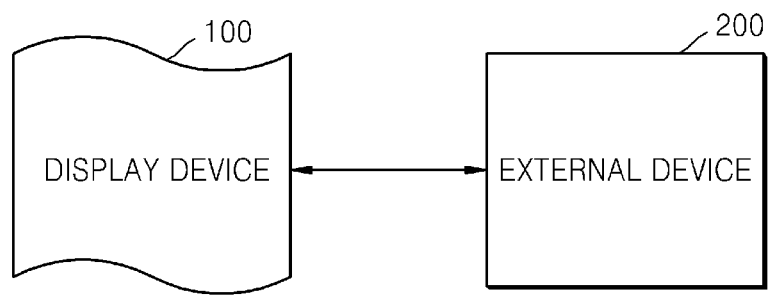
FIG. 1 is a diagram of a content transmitting and receiving system according to an exemplary embodiment.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Particularly, the term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a data-base, data structures, tables, arrays, and variables. A function provided inside components and " . . . units" may be combined into a smaller number of components and " . . . units", or further divided into additional components and " . . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

Throughout the specification, the term "bending" means that a display device is bent due to an external force. Also, throughout the specification, the term "bending motion" means a motion that bends the display device. In one or more exemplary embodiments, the bending motion may vary. For example, the bending motion may collectively refer to all motions including a folding gesture, a rolling gesture, a shaking gesture, a flapping gesture, a bending gesture, or the like that make the display device be bent by a user.

Throughout the specification, the term "content" means digital information that is provided via a wired or wireless communication network. In one or more exemplary embodiments, the content may include moving picture content (e.g., a TV program image, video-on-demand (VOD), a personal image such as User-Created Contents (UCC), a music video, a Youtube video, or the like), still image content (e.g., a photo, a picture, or the like), text content (e.g., an electronic book (poetry, novels, or the like), a letter, a work file, a web-page, or the like), music content (for example, music, radio broadcasting, or the like), an application (a widget, a game, videotelephony, or the like), and the like.

One or more exemplary embodiments will now be described more fully with reference to the accompanying drawings, in which exemplary embodiments are shown. The invention may, however, be embodied in many different forms, and should not be construed as being limited to the embodiments set forth herein; rather, these embodiments are provided so that this disclosure will be thorough and complete, and may convey the concept of one or more exemplary embodiments to those of ordinary skill in the art. In the following description, well-known functions or constructions are not described in detail because they would obscure the one or more embodiments with unnecessary detail, and like reference numerals in the drawings denote like or similar elements throughout the specification.

Expressions such as "at least one of," when preceding a list of elements, modify the entire list of elements and do not modify the individual elements of the list.

FIG. 1 is a diagram of a content transmitting and receiving system according to an exemplary embodiment.

As illustrated in FIG. 1, the content transmitting and receiving system may include a display device 100 and an external device 200. In the present embodiment, the display device 100 may include a display panel for displaying predetermined content and may be bent.

The display device 100 may have various forms. For example, the display device 100, in the present exemplary embodiment, may be a mobile phone, a smart phone, a laptop computer, a tablet personal computer (PC), an electronic book terminal, a smart television (smart TV), a terminal for digital broadcasting, a personal digital assistant (PDA), a portable multimedia player (PMP), a navigation device, or the like.

The display device 100 may perform short-distance communication with the external device 200. An example of the short-distance communication may include, but is not limited to, near field communication (NFC), Bluetooth, ZigBee, Wi-Fi Direct (WFD), UWB, or the like.

The display device 100 may perform wired communication or wireless communication (wireless local area network (LAN), Wi-Fi, or the like) with the external device 200. The communication may be done in an infrastructure mode in which an access point (AP) that transfers a wireless signal exchanges data with a plurality of terminals (PCs, or the like) in a predetermined adjacent range according to a device type. Alternatively, the communication may be done in a device use mode, or the like; and an ad hoc mode in which terminals exchange data by using a peer-to-peer (P2P) method without using an AP.

The display device 100 may detect a bending motion, and may transmit content to, or receive content from, the external device 200 in response to the detected bending motion. This will be described in detail later.

The external device 200 may indicate a device that has a communication link with the display device 100, so that the external device 200 may transmit and receive data. The external device 200 may be formed in various forms. For example, the external device 200 in the present embodiment may be a computer, a mobile phone, a smart phone, a laptop computer, a tablet PC, a kiosk, a point of sales (POS) terminal, an electronic book terminal, a PDA, a PMP, a navigation device, an internet protocol television (IPTV), a digital TV, consumer electronic (CE) devices (e.g., a refrigerator, an air conditioner, or the like that have a display panel), or the like.

Hereinafter, a structure of the display device 100 that transmits and receives content in response to a bending motion will be described in detail with reference to FIG. 2.

Figure 2:
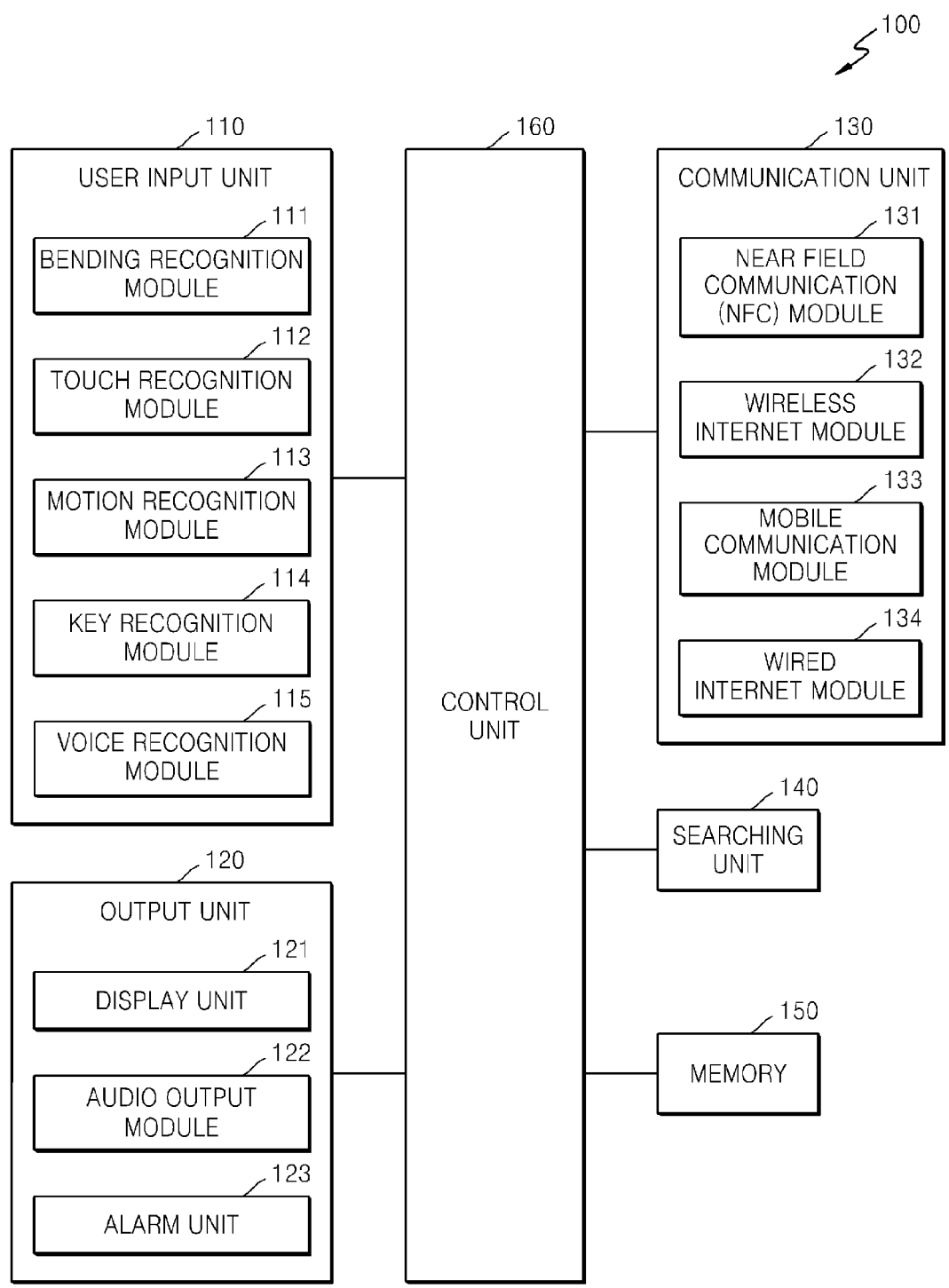
FIG. 2 is a block diagram illustrating a structure of a display device, according to an exemplary embodiment.

FIG. 2 is a block diagram illustrating a structure of the display device 100, according to an exemplary embodiment.

As illustrated in FIG. 2, the display device 100 may include a user input unit 110, an output unit 120, a communication unit 130, a searching unit 140, a memory 150, and a control unit 160. However, not all shown elements are necessary elements. That is, the display device 100 may be embodied with more or less elements than the shown elements.

Hereinafter, the shown elements are described.

The user input unit 110 may be a means by which a user inputs data so as to control the display device 100. For example, the user input unit 110 may be formed of a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, or the like. Further, when the touch pad and a display unit 121 form a mutual layer structure, this structure may be called a touch screen.

Also, the user input unit 110 may include at least one module to detect a user input. For example, the user input unit 110 may include a bending recognition module 111, a touch recognition module 112, a motion recognition module 113, a key recognition module 114, a voice recognition module 115, or the like.

The bending recognition module 111 may detect a bending motion of the display device 100 and may transfer information about the detected bending motion to the control unit 160. In the present exemplary embodiment, the bending recognition module 111 may include a plurality of bending sensors to detect the bending motion. The bending recognition module 111 may collect a plurality of pieces of information about a bending motion from the bending sensors and may analyze the plurality of pieces of information, so that the bending recognition module 111 may detect the bending motion. In the present exemplary embodiment, the bending sensors may be round or linear.

Regarding the bending motion, the bending recognition module 111 may obtain the plurality of pieces of information about a bended position (i.e., a coordinates-value and a bended line), a bending direction, a degree of bending, a bending strength, a bending speed, a total number of times the bending motion occurs, a start time of the bending motion, and an elapsed-time of the bending motion.

For example, the bending recognition module 111 may obtain the information about the bended position and the information about the bending direction, by using a factor that a pressure at a bended portion is different from a pressure at a non-bended portion. Also, the bending recognition module 111 may obtain the information about the degree of bending, a bending radius, the total number of times the bending motion occurs, the bending speed, or the like, based on a variation in power at the bended portion. Alternatively, the bending recognition module 111 may measure a deformation speed of each portion by using an acceleration sensor and may connect positions having a large speed variation, so that the bending recognition module 111 may obtain the information about the bended position and the degree of bending. Alternatively, the bending recognition module 111 may obtain the information about the bended position and the degree of bending by using a fact that a temperature, tension, and a tilt of a bended part are different from a temperature, tension, and a tilt of another part (e.g., a non-bent part).

Figure 4:
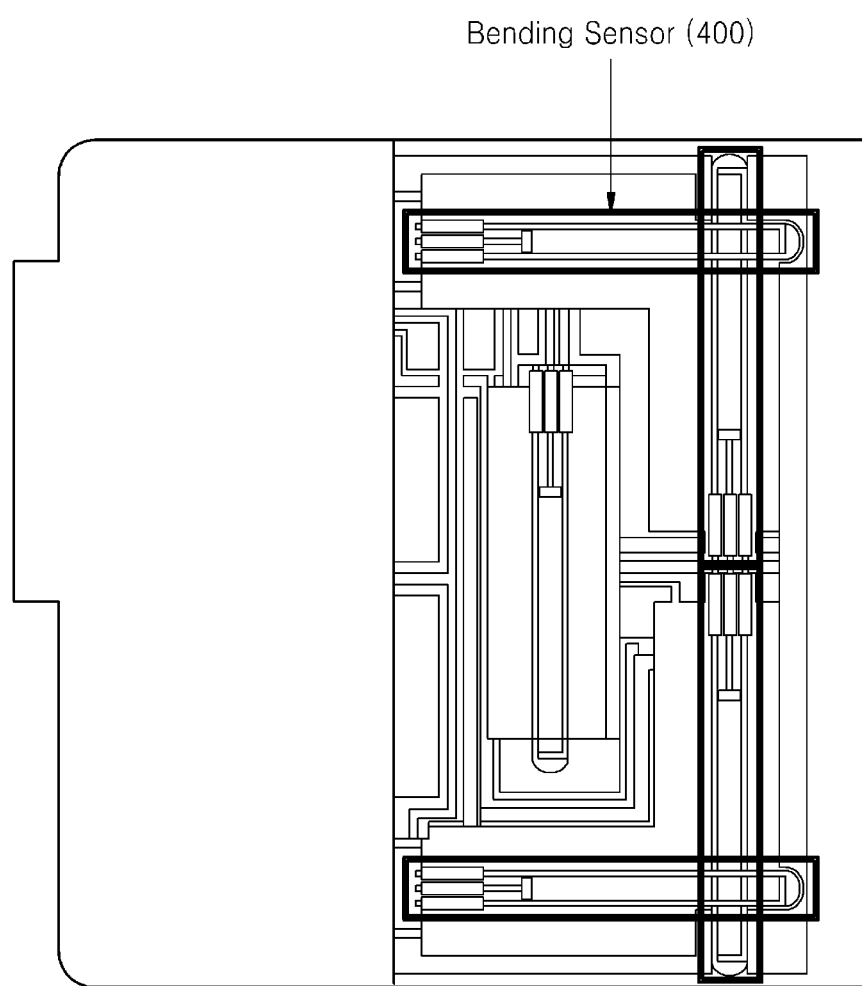
FIG. 4 illustrates a bending sensor, according to an exemplary embodiment.

With reference to FIGS. 3 and 4, a method of determining, using the bending recognition module 111, a bended position and a degree of bending will now be described in detail.

FIG. 3 illustrates a method of detecting a bending motion, according to an exemplary embodiment.

The display device 100 may collect a plurality of pieces of data related to the bending motion from various sensors. For example, the bending recognition module 111 may collect value variation of a sensor point at which a round bending sensor is positioned.

According to the present exemplary embodiment, as illustrated in FIG. 3A, a bending sensor may detect a degree of bending at a sensor point. The bending sensor may detect a degree of bending between +180 through −180 degrees. Also, as illustrated in FIG. 3B, a plurality of bending sensors that are disposed at regular intervals may detect degrees of bending at sensor points, respectively. Thus, an appropriate number of the bending sensors are disposed at appropriate positions so as to accurately detect a deformed status of the display device 100. A plurality of pieces of data about the degrees of bending that are collected from the bending sensors may be used in analyzing the deformed status of a surface of the display device 100.

FIG. 3C illustrates the degrees of bending at sensor points which are collected via the bending sensors. As illustrated in FIG. 3C, the bending recognition module 111 may collect raw data about each degree of bending at each sensor point which is collected via each bending sensor (operation S310). For example, the bending recognition module 111 may collect raw data in which a degree of bending at a first sensor point, which is collected via a first sensor S1, is '0 degrees', a degree of bending at a second sensor point, which is collected via a second sensor S2, is '10 degrees', and a degree of bending at a third sensor point, which is collected via a third sensor S3, is '15 degrees'.

The bending recognition module 111 analyzes the collected data related to the bending motion (operation S320). For example, the bending recognition module 111 may analyze a deformed status of a surface of the display device 100, based on a spatial position of each bending sensor.

As illustrated in FIG. 3D, the bending recognition module 111 may deduce three-dimensional (3D) coordinates values (X, Y, and Z axes) of each sensor point, based on each detected degree of bending at each bending sensor. For example, 3D coordinates values of the first sensor point which are deduced by the bending recognition module 111 may be (10, 4, and 2), 3D coordinates values of the second sensor point may be (11, 14, and 2), and 3D coordinates values of the third sensor point may be (5, 4, and 20). In this regard, it is possible to recognize the deformed status of the surface of the display device 100 by connecting the respective 3D coordinates values of the respective sensor points.

According to the present embodiment, the bending recognition module 111 may map a predefined event with the bending motion that is deduced according to the analyzed deformed status of the surface of the display device 100 and then may detect the predefined event (operation S330). For example, as illustrated in FIG. 3E, when a bending motion with respect to all or some portions of the display device 100 are repeated a predetermined number of times, the bending recognition module 111 may detect the bending motion as a flapping motion, when a bending status of all or some portions of the display device 100 is maintained over a predetermined time period, the bending recognition module 111 may detect the bending motion as a holding motion, and when a bending motion is performed once for less than a predetermined time period, the bending recognition module 111 may detect the bending motion as a predetermined motion.

Also, the bending recognition module 111 may map a first bending motion with a predefined event by referring to a position of a sensor point at which the first bending motion is detected. For example, when a center portion of the surface of the display device 100 projects for more than a predetermined time period, the bending recognition module 111 may map and detect such a projecting status as a motion that convexly bends all portions of the display device 100.

FIG. 4 illustrates a bending sensor 400, according to an exemplary embodiment. As illustrated in FIG. 4, the bending sensor 400 may have a line-shape. The bending sensor 400 may include a coil.

The bending sensor 400 may detect an inductance variation due to a change of a current that flows in the coil. The bending recognition module 111 may receive a position and an inductance variation value of a bending sensor at which the inductance variation occurs, from the bending sensor.

The bending recognition module 111 may deduce a bended line based on the position of the bending sensor, and may deduce a degree of bending based on the inductance variation value.

Also, the bending recognition module 111 may map a user input bending motion with a predefined event and may detect the predefined event, based on the bended line, the degree of bending, and the inductance variation value.

Referring back to FIG. 2, the touch recognition module 112 may detect a touch gesture on a touch screen, which is performed by a user, and may transfer information about the touch gesture to the control unit 160.

The touch recognition module 112 may include various sensors to detect a touch or a proximate touch on the touch sensor. An example of the sensor to detect the touch on the touch screen may include a tactile sensor. The tactile sensor detects a contact of a specific object similar to how a person can detect. For example, the tactile sensor may detect various types of information such as roughness of a contact surface, hardness of the contact object, temperature of a contact point, or the like.

Another example of the sensor to detect the touch on the touch screen may include a proximity sensor. The proximity sensor detects existence of an object that approaches a predetermined detection surface or that exists nearby, by using a force of an electro-magnetic field or an infrared ray, without using a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, or the like.

The motion recognition module 113 may recognize a motion of the display device 100, and may transmit information about the motion of the display device 100 to the control unit 160. The motion recognition module 113 may recognize a 3D motion or a rotation motion of the display device 100, regardless of a deformation in shape of the display device 100.

The motion recognition module 113 may include various types of a sensor to recognize the motion of the display device 100. For example, examples of the sensor may include an acceleration sensor, a tilt sensor, a gyro sensor, a 3-axis magnetic sensor, or the like.

In an exemplary embodiment, a motion input may include a 3D motion input by which the display device 100 moves in X, Y, and Z-axis directions, a rotation motion input by which the display device 100 rotates in at least one direction in a 3D space, a shaking motion input by which the display device 100 is shaken in at least one direction in the 3D space, a tilt motion input by which the display device 100 is tilted in a predetermined direction, or the like.

The motion recognition module 113 may determine whether a rear surface of the display device 100 faces the external device 200, by using the various sensors and position information of the external device 200. The display device 100 may receive the position information of the external device 200 from the external device 200 or may directly obtain the position information. For example, the display device 100 may recognize a position of the external device 200 by transmitting and receiving an infrared light, or by analyzing an image that is captured by a camera.

The key recognition module 114 may recognize a user command that is input via a hardware key (e.g., a direction key, a text key, a mouse, or the like). The voice recognition module 115 may recognize a user voice by using a voice recognition engine and then may transfer the recognized user voice to the control unit 160.

The output unit 120 may output an audio signal, a video signal, or an alarm signal, and may include a display unit 121, an audio output module 122, an alarm unit 123, or the like.

The display unit 121 displays information that is processed by the display device 100. For example, the display unit 121 may display an external device list including a plurality of pieces of identification (ID) information about external devices, a content list, or the like.

Also, the display unit 121 may display a graphical user interface (GUI) to provide a plurality of pieces of information, which are processed by the display device 100, to a user in a visual and intuitional manner. For example, the display unit 121 may move the plurality of pieces of ID information about external devices included in the external device list from an outer side of a screen to an inner side of the screen and may display the plurality of pieces of ID information. Also, the display unit 121 may change and display a size of an image corresponding to exchanged content according to a transmission rate or a reception rate of the content. Also, the display unit 121 may display a graphic image on the screen, wherein the graphic image indicates transmission of content that is selected by the user.

The display unit 121 may include at least one of a liquid crystal display (LCD), a thin film transistor-liquid crystal display (TFT-LCD), an organic light-emitting display device, a flexible display, a 3D display, and an electrophoretic display. Also, according to a type of the display device 100, at least two display units 121 may be available.

As described above, when the touch pad and the display unit 121 form the mutual layer structure and then are formed as a touch screen, the display unit 121 may be used as both an output device and input device. The touch screen may be formed to detect a position of a touch input, a touched area, and a touch input pressure. Also, the touch screen may detect not only an actual touch but also may detect a proximity-touch.

In the present specification, the term "actual touch" indicates a case in which a pointer actually touches a screen, and the term "proximity-touch" indicates a case in which a pointer does not actually touch a screen but approaches the screen within a predetermined distance. In the present specification, the pointer indicates an instrument that is used to touch or to proximately touch a specific portion of a displayed screen. Examples of the pointer include an electronic pen, a finger, and the like.

The audio output module 122 outputs audio data that is received via the communication unit 130 or is stored in the memory 150. The audio output module 122 may include a speaker, a buzzer, or the like.

The alarm unit 123 outputs a signal to inform about an occurrence of an event. An example of the event that occurs in the display device 100 may include reception of an inquiry signal, a message, a user input (a bending input, a touch input, a key input, a voice input, and a motion input), or the like from the external device 200. The alarm unit 123 may output a signal to inform about the occurrence of the event by using at least one of an audio signal, a video signal, and a vibration signal.

The communication unit 130 may include one or more elements for enabling communication with the external device 200 and a network including the external device 200. For example, the communication unit 130 may include an NFC module 131, a wireless internet module 132, a mobile communication module 133, a wired internet module 134, or the like.

The NFC module 131 is for short-distance communication. Examples of the short-distance communication may include, but are not limited to, Bluetooth, ultra wideband (UWB), ZigBee, NFC, WFD, IrDA, or the like.

Bluetooth indicates a standard technology for wireless communication devices that perform wireless communication there between within a short range, by using low power. UWB indicates a wireless communication technology used to transmit a large amount of data in a short period via a large spectrum frequency, by using low power.

NFC is related to short-distance wireless communication by connecting devices that are near to each other using magnetic field induction, and communication may be performed in every direction. WFD is a new version of a Wi-Fi technology and is mainly characterized in direct communication between devices. That is, although there is not a hotspot, a router, or an access point (AP), if the devices use WFD, the devices may communicate with each other and thus may share information there between. Also, unlike Bluetooth, WFD does not require a pairing procedure, may perform long-distance communication within a maximum distance of 200 m, and may perform 1:N communication with several devices.

ZigBee indicates one of the IEEE 802.15.4 standards that support short-distance communication. ZigBee is a technology for short-distance communication within a distance of 10-20 m and ubiquitous computing in a wireless networking field such as a house or an office.

The wireless internet module 132 indicates a module for connection to wireless internet and may be arranged inside or outside the display device 100. The wireless internet module 132 exchanges a wireless signal with at least one of a base station, the external device 200, and a server in a mobile communication network. The wired internet module 134 indicates a module for connection to wired internet.

In the present embodiment, the communication unit 130 may exchange content with the external device 200 according to the Digital Living Network Alliance (DLNA) specification. Examples of devices that are defined in the DLNA specification may include a digital media server (DMS) that provides content, a digital media renderer (DMR) that renders content, and a digital media controller (DMC) that searches for content provided by the DMS and then sets up connection between the DMS and the DMR by matching the searched content with a rendering capability of the DMR.

The DLNA specification selects the Universal Plug and Play (UPnP) specification so as to discover and control the devices. The UPnP specification indicates technology that enables networking, particularly, home networking between network devices such as various electronic products, a network printer, an internet gate, or the like, by extending a Plug and Play function, which allows a PC to automatically detect peripheral devices, to an entire network, based on an internet standard technology such as transmission control protocol/internet protocol (TCP/IP), a hypertext transfer protocol (HTTP), an extensible markup language (XML), or the like.

An UPnP network is formed of an UPnP control device (CD) that is connected to an IP-based home network and then is controlled; and an UPnP control point (CP) that controls the UPnP CD. The UPnP CD and the UPnP CP perform communication by using an UPnP protocol stack structure including internet protocols such as TCP/IP, HTTP, or the like, and technologies such as the XML, a simple object access protocol (SOAP), or the like. The UPnP CP performs control by transmitting an UPnP control request to the UPnP CD.

Figure 5:
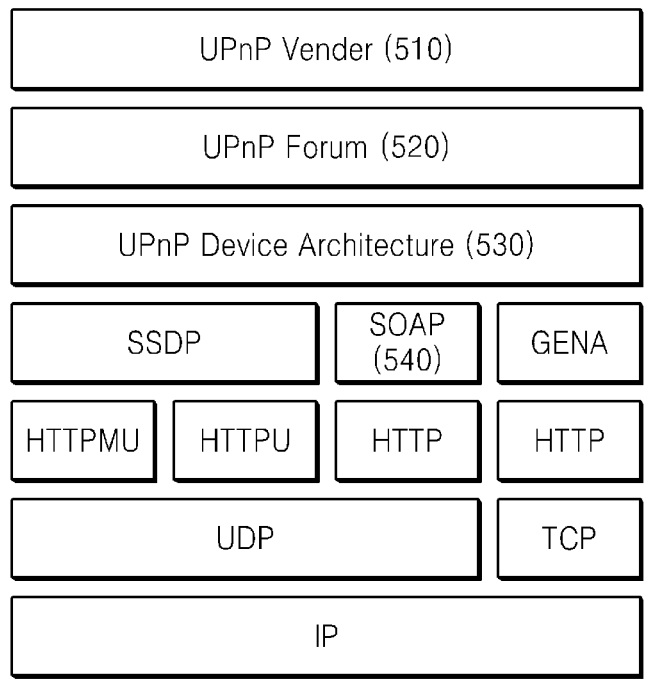
FIG. 5 illustrates a Universal Plug and Play (UPnP) protocol stack, according to an exemplary embodiment.

FIG. 5 illustrates a UPnP protocol stack, according to an exemplary embodiment.

A UPnP vendor 510 is a protocol for extending a function of a UPnP. A UPnP forum 520 provides a device control protocol (DCP). A UPnP Device Architecture 530 corresponds to a core of the UPnP.

The UPnP CD and the UPnP CP perform communication by using a control protocol that is referred to as an SOAP 540.

That is, when a CP discovers a CD that is connected to a network, and receives a detailed description about a device and a service from the CD, the CP is prepared to control the CD. Here, the CP may control the CD by calling an action that executes a particular service of the CD. The action in a UPnP environment may be generated by an XML and may be transmitted by using a SOAP communication specification.

According to the present embodiment, the display device 100 may function as the CP, and the external device 200 may function as the CD. Alternatively, the external device 200 may function as the CP, and the display device 100 may function as the CD.

Figure 6:
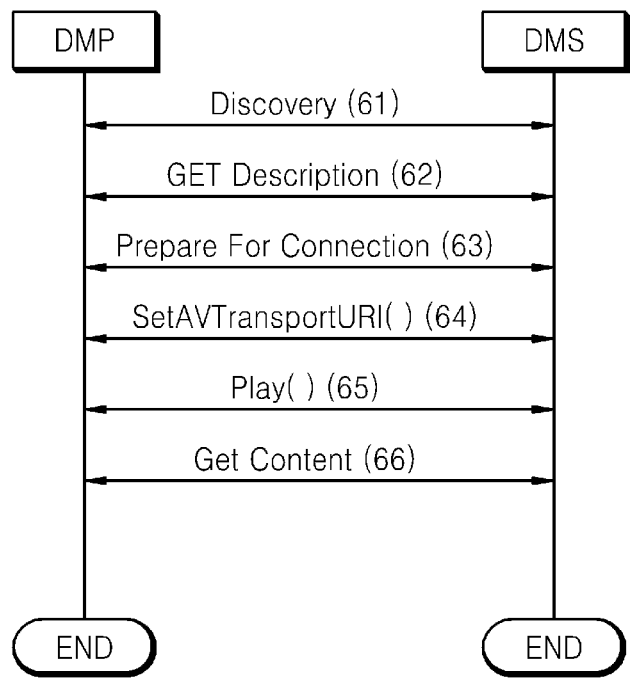
FIG. 6 is a flowchart illustrating the Digital Living Network Alliance (DLNA) specification, according to an exemplary embodiment.

FIG. 6 is a flowchart illustrating the DLNA specification, according to an exemplary embodiment.

In operation 61, a digital media player (DMP) searches for UPnP devices via operations in a UPnP device architecture (DA) and then discovers a DMS.

In operation 62, the DMP may request a description from the discovered DMS and then may receive the description from the DMS. Here, the DMP may check a content list and content information of the DMS via CDS:Browse/Search( ). The content information may include an ID, a title, a generation date, a type, an access uniform resource identifier (URI), or the like that are related to content. The DMP may display the content list to a user via a UI.

In operation 63, the DMP may set information by using a PrepareForConnection action of a connection manager of the DMS. A set message may be generated by an XML and may include protocol information that is formed according to a SOAP format, an ID of the connection manager, a connection ID, and information about a transmission direction of the content. A response from the DMS may include a service instance ID of the connection manager, an AV transport service instance ID, and an RCS service ID.

For example, the DMS may recognize, via the PrepareForConnection action, that a transmission protocol is an HTTP-GET protocol, a content format is an MPEG2-TS format, the ID of the connection manager is 0, and the transmission direction is INPUT.

In operation 64, the DMP may notify the DMS about target reproduction content. The DMP may notify the DMS about the target reproduction content by using a SetAVTransportURI action of an AV transport service of the DMS.

As in the PrepareForConnection, SetAVTransportURI may be generated by an XML and may be formed according to the SOAP format. That is, SetAVTransportURI may include a URI of an XML document including a virtual instance ID of the AV Transport service, a URI of content, and metadata information of the content.

In operation 65, the DMP may prepare reproduction of the content by using the PrepareForConnection action and the SetAVTransportURI action and then may transmit a Play action to the DMS.

In operation 66, the DMP may obtain and reproduce the content. When a reproduction method corresponds to a push method, the DMS transmits selected content to the DMP, and then the DMP receives and reproduces the selected content. When a reproduction method is a pull method, the DMP accesses the DMS and requests corresponding content, so that the corresponding content is reproduced.

Referring back to FIG. 2, the searching unit 140 may search for the external device 200 that is positioned within a predetermined distance from the display device 100. That is, when a power is input to the display device 100, the searching unit 140 enters a standby status and then broadcasts an inquiry message once or at regular intervals, by using an ID packet, so as to detect the existence of the external device 200. Here, when the external device 200 receives the inquiry message and then transmits an inquiry response message, the searching unit 140 detects the external device 200, based on the inquiry response message.

The memory 150 may store a program (e.g., an address book application, a content management application, a content reproduction application, a backup application, a message application, a chatting application, a short-distance communication application, a social network service (SNS) application, a communication application, or the like) to process and to control the control unit 160, or may store a plurality of pieces of data (e.g., an external device list, a content list, content, a graphic image, or the like) that are input/output.

Also, the memory 150 may store bending motions that are matched with commands (or applications). For example, the memory 150 may match a bending motion, by which the display device 100 is bent so that a screen of the display device 100 is concavely bent, with a command (or an address book application) that allows the external device list to be displayed, and may match a bending motion, by which the display device 100 is bent so that the screen of the display device 100 is convexly bent, with a command (or a message application) that allows content to be transmitted to the external device 200.

The memory 150 may store a first application and a second application that are matched with each other. For example, the memory 150 may match the address book application with the communication application, or may match the content management application with the backup application.

The memory 150 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. Also, the memory 150 may drive a web storage that performs a storing function of the memory 150 via the Internet.

The control unit 160 may generally control all operations by the display device 100. That is, the control unit 160 may control the user input unit 110, the output unit 120, the communication unit 130, the searching unit 140, and the memory 150.

For example, the control unit 160 may select the external device 200, may select content, or may perform control and processing so as to exchange the selected content with the external device 200, based on a bending motion.

Figure 7A:
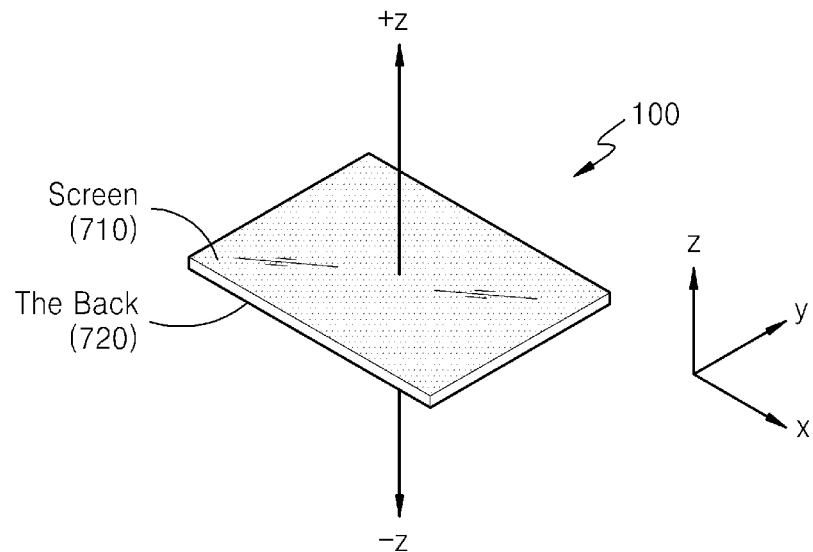
FIGS. 7A through 7C illustrate bending directions, according to an exemplary embodiment.
Figure 7B:
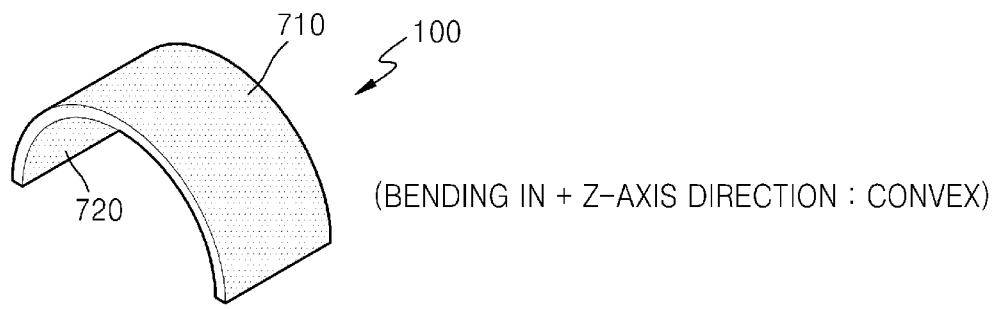
Figure 7C:
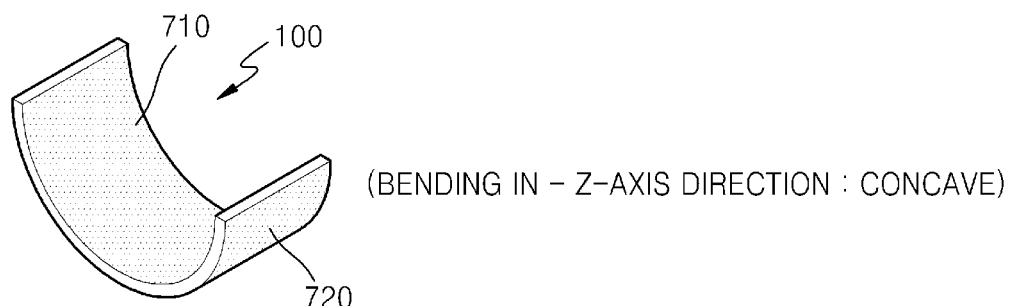

FIGS. 7A through 7C illustrates bending directions, according to an exemplary embodiment.

As illustrated in FIG. 7A, the display device 100 may be divided into a front portion including a screen 710, and a back portion 720 not including the screen 710. Also, in the present specification, a bending motion in a +Z direction may cause convex bending, and a bending motion in a −Z direction may cause concave bending.

As illustrated in FIG. 7B, a bending motion that bends the display device 100 in the +Z direction may mean that the display device 100 is bent so that the front portion including the screen 710 projects. Also, the bending motion that projects the front portion including the screen 710 may mean that the display device 100 is bent so that the back portion 720 is concavely bent.

As illustrated in FIG. 7C, a bending motion by the display device 100 is bent in the −Z direction may mean that the display device 100 is bent so that the front portion including the screen 710 is concavely bent. Also, the bending motion that concavely bends the front portion including the screen 710 may mean that the display device 100 is bent so that the back portion 720 is convexly bent.

Figure 8:
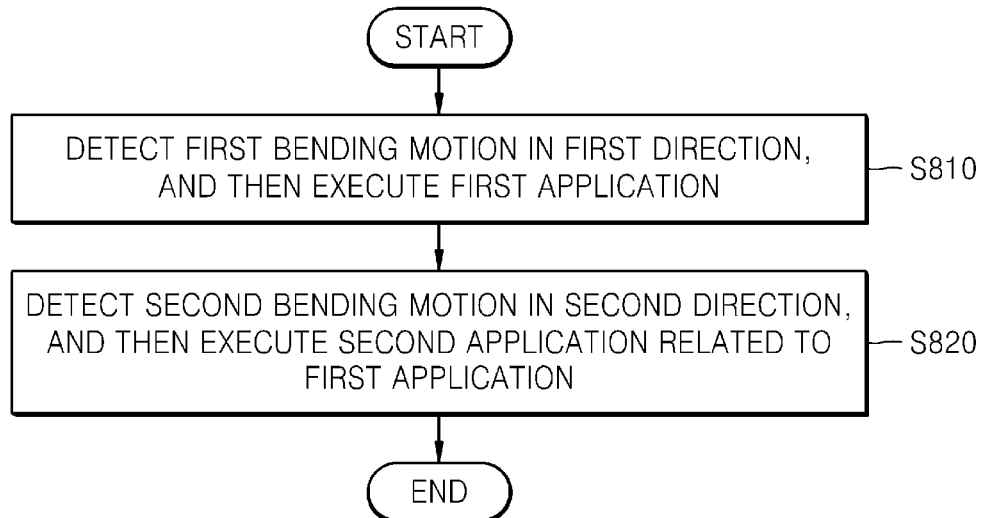
FIG. 8 is a flowchart illustrating a method of executing an application, according to an exemplary embodiment.

FIG. 8 is a flowchart illustrating a method of executing an application, according to an exemplary embodiment.

In operation S810, when the display device 100 detects a first bending motion, the display device 100 may execute a first application. The first bending motion may indicate that the display device 100 is bent in a first direction and then is deformed to a first form.

For example, the first bending motion may indicate that the display device 100 is deformed so that the screen may become concave, or may indicate that the display device 100 is deformed so that the screen may become convex.

In the present exemplary embodiment, the first application may include at least one of an address book application for providing an external device list, a content management application for providing a content list, and a content reproduction application for reproducing content.

In operation S820, when the display device 100 detects a second bending motion, the display device 100 may execute a second application that is related to the first application.

The second bending motion may indicate that the display device 100 is bent in a second direction that is different from the first direction, so that the display device 100 is deformed to a second form that is different from the first form. For example, the second bending motion may be in an opposite direction to the first bending motion. That is, when the first bending motion indicates that the display device 100 is deformed so that the screen becomes concave, the second bending motion may indicate that the display device 100 is deformed so that the screen becomes convex.

In the present exemplary embodiment, the second application may be stored in the memory 150 while the second application is related to the first application.

For example, when the first application is the address book application, the second application may be a communication application. In this case, when the display device 100 detects the first bending motion, the display device 100 may execute the address book application so as to display the external device list (or a list of users that have external devices), and when the display device 100 detects the second bending motion, the display device 100 may execute the communication application so as to form a phone-call path with the external device 200 that is selected by a user.

In another embodiment, the first application may be the content management application for providing a content list or may be the content reproduction application for reproducing content, and the second application may be a backup application.

In this case, when the display device 100 detects the first bending motion, the display device 100 may execute the content management application so as to display the content list, and when the display device 100 detects the second bending motion, the display device 100 may execute the backup application so as to back up content in an external server. Also, when the display device 100 detects the first bending motion, the display device 100 may execute the content reproduction application so as to reproduce content, and when the display device 100 detects the second bending motion, the display device 100 may execute the backup application so as to back up the reproduced content in the external server.

The term 'backup' may mean that data is copied to another storage device so as to prepare for a case in which the data is lost or deleted due to a user's mistake, a device error, a computer virus infection, or the like.

In the present embodiment, the first application may be the content management application so as to provide the content list, and the second application may be at least one of a message application, a chatting application, and an SNS application.

In this case, when the display device 100 detects the first bending motion, the display device 100 may execute the content management application so as to display the content list, and when the display device 100 detects the second bending motion, the display device 100 may execute at least one of the message application, the chatting application, and the SNS application so as to transmit content, which is selected from the content list by the user, to the external device 200. This process will be described in detail with reference to FIGS. 9 and 19.

In the present embodiment, when the display device 100 detects the second bending motion, the display device 100 may recommend and display a second application that is related to a first application.

That is, when the display device 100 detects the second bending motion, the display device 100 may provide a list of a plurality of second applications that are related to the first application, may receive selection with respect to at least one of the second applications in the list, and then may execute the second application.

For example, if the first application corresponds to the content reproduction application, when the display device 100 detects the first bending motion, the display device 100 may execute the content reproduction application so as to reproduce predetermined content. When the display device 100 detects the second bending motion while the content is being reproduced, the display device 100 may display a second application list including a plurality of second applications (e.g., a message application, a chatting application, an SNS application, or the like) for transmitting the reproduced content to the external device 200. When the user selects the message application, the display device 100 may transmit the reproduced content to the external device 200 via the message application.

In another embodiment, the first application and the second application may be separate applications. Alternatively, the first application and the second application may correspond to a plurality of modules that are technically divided in one application.

Figure 9:
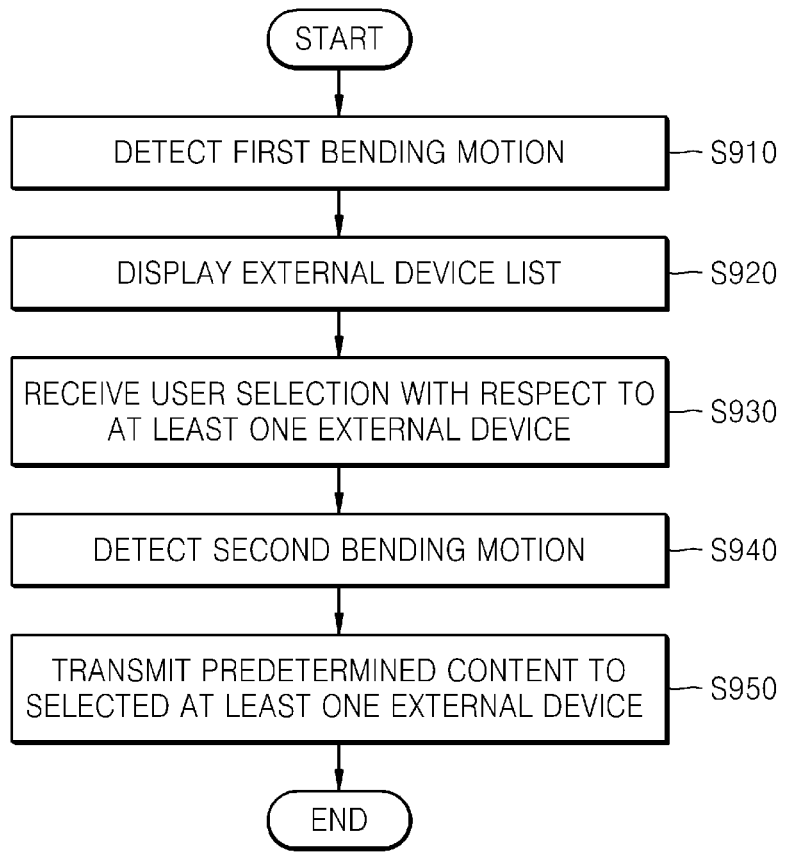
FIG. 9 is a flowchart of a method of transmitting content, according to an exemplary embodiment.

Hereinafter, a method of transmitting, by the display device 100, content to the external device 200 based on a user's intuitional bending motion will be described in detail with reference to FIG. 9. Here, it is assumed that a first application is an address book application that manages an external device list or a search application that searches for an external device, and a second application is at least one of a message application, a chatting application, an SNS application, and a short-distance communication application. That is, operations S920 and S930 may be performed via the first application, and operation S950 may be performed via the second application. FIG. 9 is a flowchart of a method of transmitting content, according to an exemplary embodiment.

Referring to FIG. 9, the method includes operations that are processed in chronological order by the display device 100 shown in FIG. 2. Thus, hereinafter, although the above descriptions of the display device 100 shown in FIG. 2 are omitted, the descriptions may also be applied to the method of FIG. 9.

In the present embodiment, the display device 100 may detect a first bending motion that bends the display device 100 in a first direction (operation S910). The first bending motion may be a bending motion that requests an external device list.

The display device 100 may analyze a bended position (i.e., a bended line), a bending direction, a degree of bending, a bending strength, a bending speed, a total number of times the first bending motion occurs, a start time of the first bending motion, an elapsed-time of the first bending motion, or the like, so as to detect the first bending motion.

In the present embodiment, the first bending motion may cause all or some portions of the display device 100 to be bent in a −Z-axis direction. That is, in the first bending motion, all or some portions of the display device 100 may be bent so that a screen of the display device 100 may become concave.

In another embodiment, the first bending motion may cause all or some portions of the display device 100 to be bent in a +Z-axis direction. That is, in the first bending motion, all or some portions of the display device 100 may be bent so that the screen of the display device 100 may become convex.

The display device 100 may display the external device list on the screen, based on the first bending motion (operation S920). The external device list may include a plurality of pieces of ID information about external devices. The ID information about an external device may contain unique information about the external device which is used to discriminate the external device from another device. For example, the ID information about the external device may include a device ID, a device name, a media access control (MAC) address, an ID image (e.g., an icon), or the like. In the present embodiment, the display device 100 may display the external devices of the external device list at one time or may sequentially display the external devices. This will now be described with reference to FIGS. 10A and 10B.

Figure 10A:
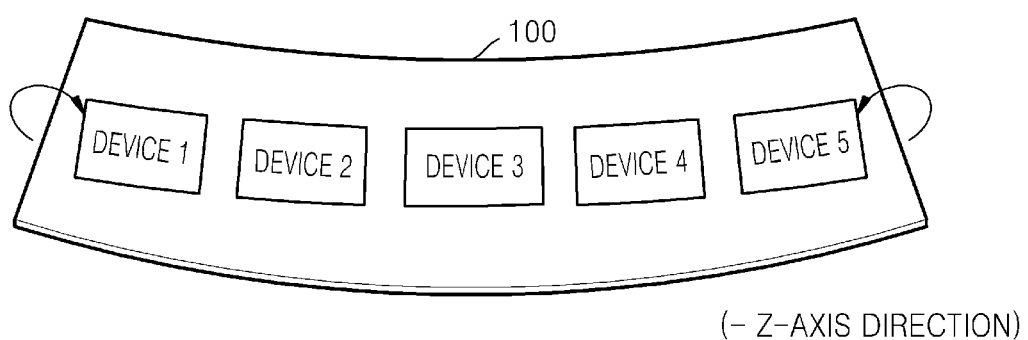
FIGS. 10A and 10B illustrate screens that display an external device list, according to an exemplary embodiment.
Figure 10B:
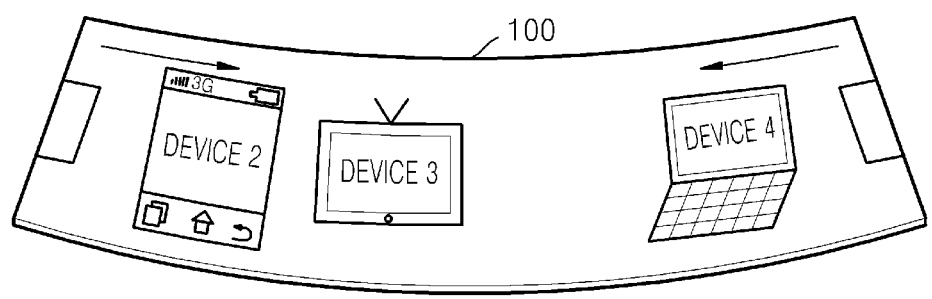

FIGS. 10A and 10B illustrate screens that display an external device list, according to an exemplary embodiment.

As illustrated in FIG. 10A, according to the present embodiment, a user may bend the display device 100 in a −Z-axis direction. In this case, the display device 100 may detect a first bending motion that concavely bends a screen of the display device 100. When a motion that concavely bends a screen is previously set as a motion of requesting an external device list, the display device 100 may display the external device list on the screen. Here, as illustrated in FIG. 10A, external devices included in the external device list may be all displayed at one time on the screen.

Alternatively, as illustrated in FIG. 10B, the display device 100 may display a plurality of pieces of ID information of the external devices included in the external device list while the plurality of pieces of ID information appear from an outer side of the screen toward an inner side of the screen, according to the first bending motion. That is, the display device 100 may provide a graphical effect in which one or more pieces of ID information about one or more external devices appear from both ends of the screen along the screen that is concavely bent.

In another embodiment, the display device 100 may provide a graphical effect in which the external device list appears from one side (e.g., a right edge) of the screen and then moves toward another side (e.g., a left edge) of the screen.

Referring back to FIG. 9, the display device 100 may receive a user selection with respect to at least one external device included in the external device list (operation S930). That is, a user may check the displayed external device list and then may select the external device that is a content reception device.

In the present embodiment, the user may select the at least one external device included in the external device list, based on at least one of a bending input, a touch input, a voice input, a key input, and a motion input. That is, the user may bend a predetermined area of the display device 100, may touch a predetermined area of a touch screen, may press a predetermined key, may input a predetermined voice, or may perform a predetermined motion with respect to the display device 100, so that the user may select the at least one external device.

Hereinafter, the bending input from among various user inputs for selection of an external device will be described.

According to an exemplary embodiment, the display device 100 may detect a third bending motion that bends the display device 100 by at least a predetermined degree. Then, the display device 100 may select an external device that corresponds to a bended position of the third bending motion. This is described in detail with reference to FIGS. 11A through 11C.

Figure 11A:
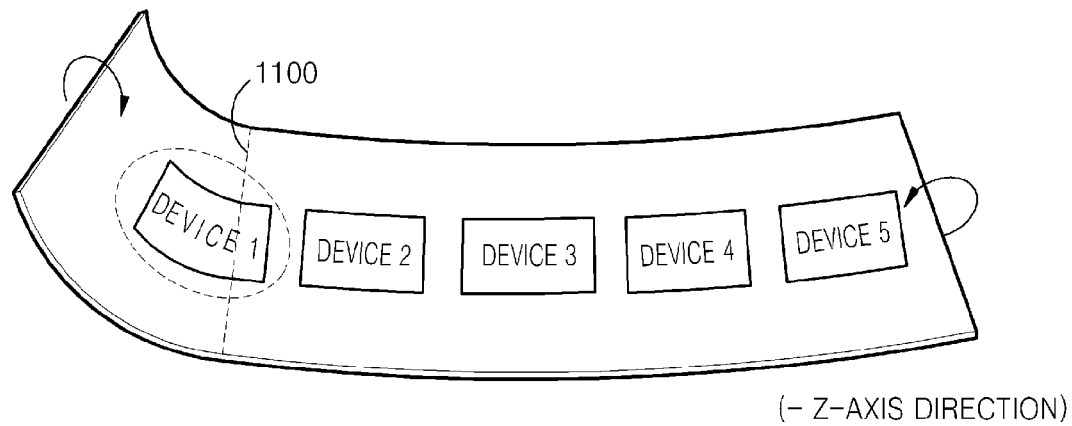
FIGS. 11A through 11C illustrate screens related to selection of an external device, according to an exemplary embodiment.
Figure 11B:
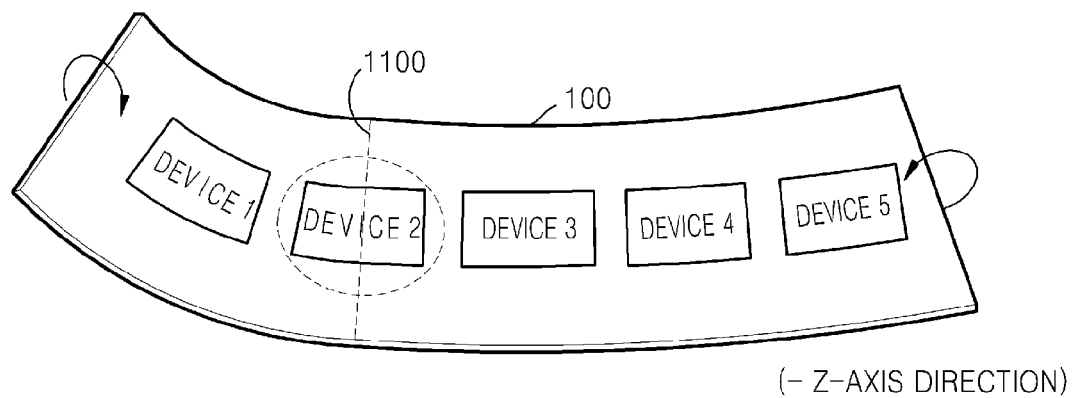
Figure 11C:
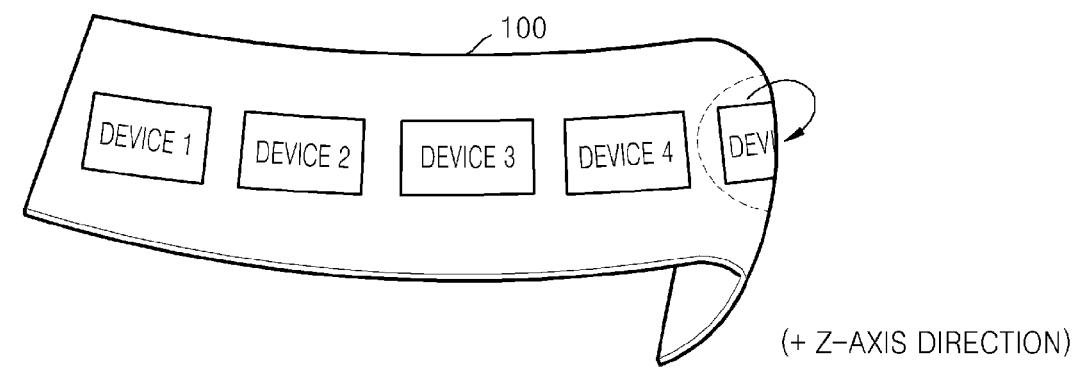

FIGS. 11A through 11C illustrates screens related to selection of an external device, according to an exemplary embodiment.

As illustrated in FIGS. 11A through 11C, when external devices included in an external device list are displayed due to a first bending motion, a user may bend an area that displays ID information of an external device that is a content reception device, so that the user may select the external device.

As illustrated in FIG. 11A, with respect to the display device 100 that is concavely (in a −Z-axis direction) bent by a first degree due to a first bending motion, the user may further concavely (in the −Z-axis direction) bend an area that displays ID information (e.g., an ID, an icon, or the like) of a device 1 by a second degree that is greater than the first degree. In this case, the display device 100 may detect a bended line 1100 of a third bending motion that concavely (in the −Z-axis direction) bends the display device 100 by the second degree, so that the display device 100 may select the device 1, which corresponds to the bended line 1100 of the third bending motion, as a reception device.

As illustrated in FIG. 11B, when the user concavely (in the −Z-axis direction) bends an area of the screen which displays a device 2 by a second degree, the display device 100 selects the device 2 as a reception device.

As illustrated in FIG. 11C, the user may bend a portion of the display device 100 in an opposite direction to the first bending motion, so that the user may select an external device. That is, at the display device 100 that is concavely (in the −Z-axis direction) bent due to the first bending motion, the user may convexly (in a +Z-axis direction) bend an area that displays ID information (e.g., an ID, an icon, or the like) of a device 5, so that the user may select the device 5 as a reception device.

The user may move ID information of at least one external device included in the external device list to a center area of the screen, and then may bend the center area of the screen, so that the user may select the at least one external device that is a content reception device. In the present embodiment, the user may move the ID information of the at least one external device to the center area of the screen via a touch input. Also, the user may move the ID information of the at least one external device to the center area of the screen by controlling a direction key or by inputting a voice command.

Also, the user may move the ID information of the at least one external device to the center area of the screen by inputting a motion that tilts the display device 100. This is described with reference to FIGS. 12A through 12D.

FIGS. 12A through 12D illustrate screens related to a method of scrolling an external device list, according to an exemplary embodiment. Throughout the specification, the term 'scroll' means a motion in which the display device 100 vertically or horizontally moves information that is displayed on a screen or a panel. New information that corresponds to an amount of information which disappears from a scrolled screen appears at an opposite side of the screen.

Figure 12A:
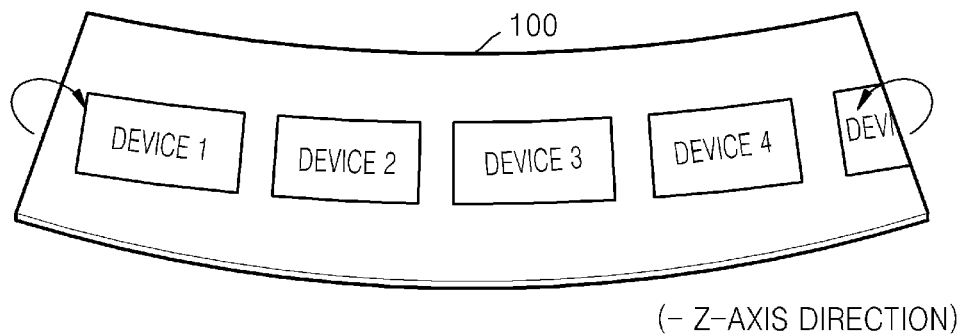
FIGS. 12A through 12D illustrate screens related to a method of scrolling an external device list, according to an exemplary embodiment.

As illustrated in FIG. 12A, when the external device list includes lots of pieces of ID information about external devices, the display device 100 may not display all of the external devices on one screen. In this case, the user may tilt the display device 100 so as to check all of the external devices included in the external device list.

Figure 12B:
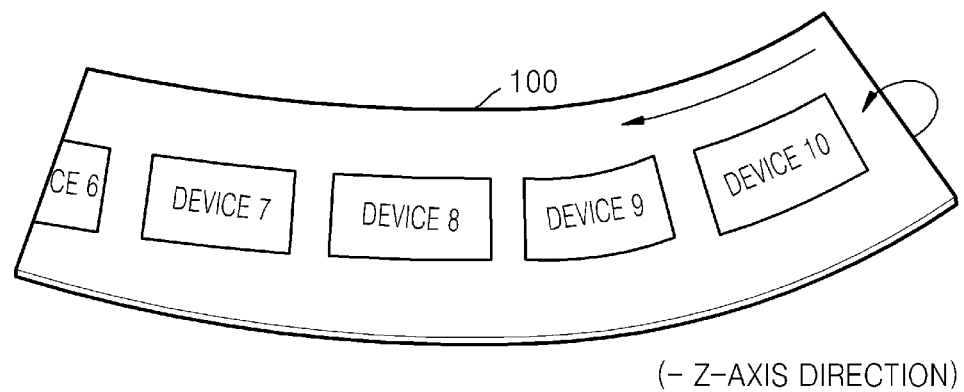

For example, as illustrated in FIG. 12B, when a first bending motion tilts the display device 100 such that the right side is raised as compared to the left side of the display device 100, the displayed list will scroll from right to left in a left direction similar to items sliding on a plate when the right side is raised. Thus, the display device 100 may scroll through the external device list and then may display ID information of an external device which is obstructed at a right side of the screen.

Figure 12C:
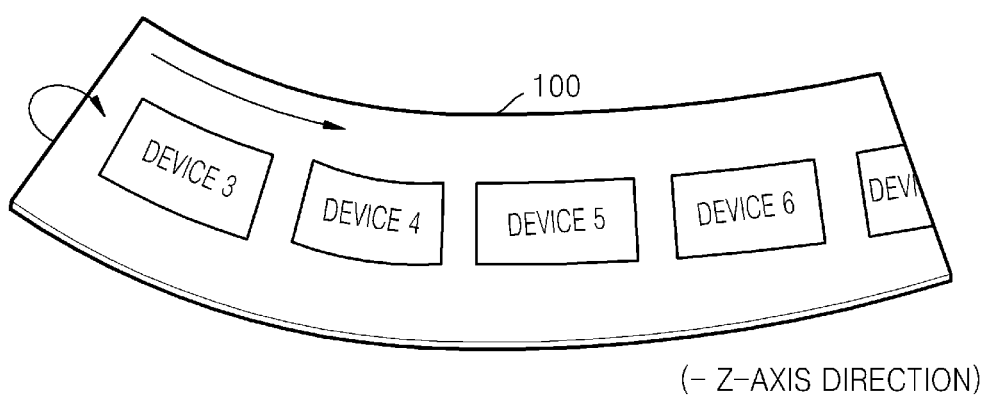

Also, as illustrated in FIG. 12C, when the first bending motion tilts the display device 100 such that the left side is raised as compared to the right side of the display device 100, the displayed list will scroll from left to right in a right direction similar to items sliding on a plate when the left side is raised. Thus, the display device 100 may scroll the external device list and then may display ID information of an external device which is obstructed at a left side of the screen.

Figure 12D:
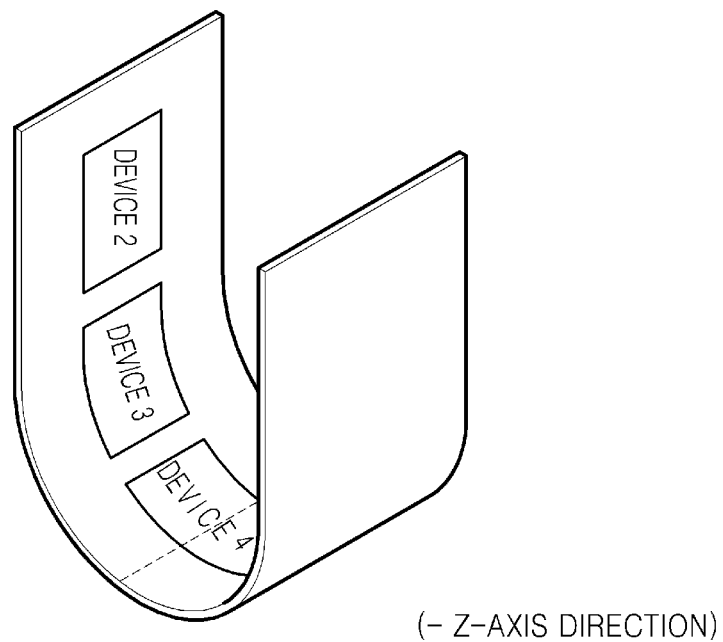

As illustrated in FIG. 12D, the user may bend the display device 100 in a left or right direction so as to move ID information of an external device (e.g., a device 4) that is a content reception device, and then may bend a center area of the display device 100. In this case, the device 4 that is displayed on the center area of the display device 100 is selected as a reception device.

For convenience of description, referring to FIGS. 12A through 12D, the external device list is scrolled in right and left directions. However, in another embodiment, the external device list may be scrolled in up and down directions. Also, the user may scroll the external device list not by tilting the display device 100 but by bending a left or right area of the display device 100 by a second degree that is greater than the first degree.

Additionally, according to another exemplary embodiment, if the list is represented in a two dimensional matrix or array, it may be possible to scroll in diagonal direction as well as left, right, up, and down by using a combination of tilting and bending edges of the display device 100.

According to an exemplary embodiment, a plurality of pieces of ID information of external devices included in the external device list may overlap with each other. In this case, an arrangement order of the external devices included in the external device list may be changed based on a degree of bending of the first bending motion. In this regard, an external device that is displayed foremost when the first bending motion is ended may be selected as a reception device. This will now be described with reference to FIGS. 13A through 13D.

FIGS. 13A through 13D illustrates screens related to selection of an external device, according to another exemplary embodiment.

Figure 13A:
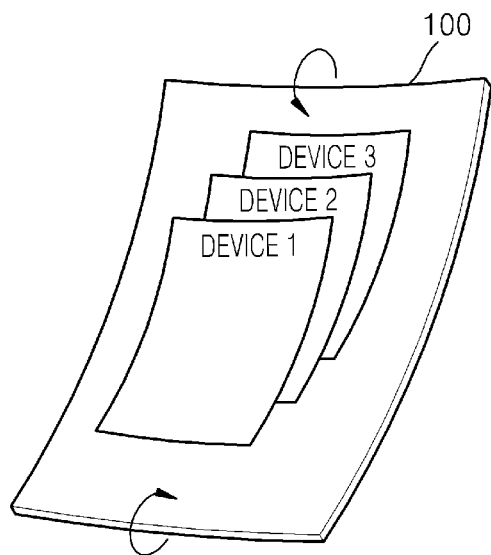
FIGS. 13A through 13D illustrate screens related to selection of an external device, according to another exemplary embodiment.
Figure 13B:
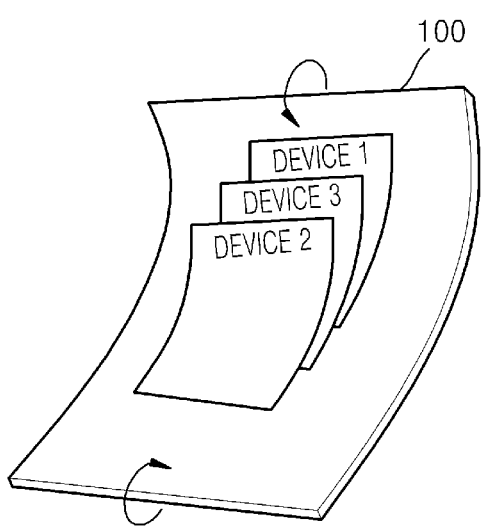
Figure 13C:
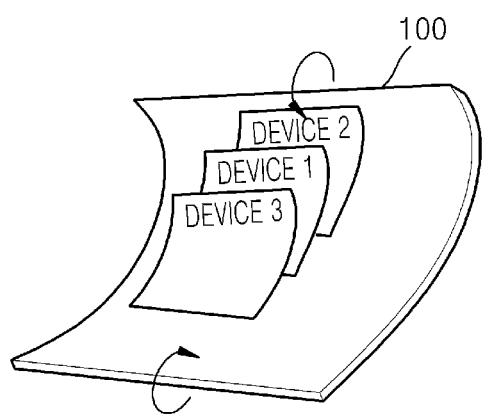

As illustrated in FIGS. 13A through 13C, ID information of an external device that is displayed foremost may be changed according to a degree of bending of a first bending motion. For example, at a first degree, a device 1 may be displayed foremost, at a second degree that is greater than the first degree, a device 2 may be displayed foremost, and at a third degree that is greater than the second degree, a device 3 may be displayed foremost.

Figure 13D:
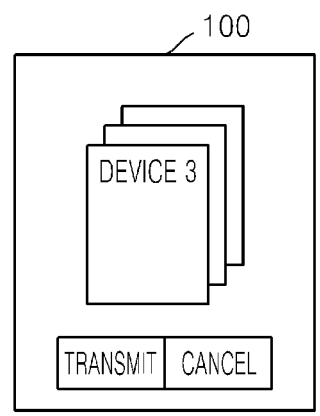

As illustrated in FIG. 13D, when a user ends a bending motion (i.e., a degree of bending becomes 0) while the device 3 is displayed foremost, the device 3 is selected as a reception device.

Referring back to FIG. 9, the display device 100 may detect a second bending motion that bends the display device 100 in a second direction (operation S940). In the present embodiment, the second direction may be opposite to the first direction. For example, when the first direction is a +Z-axis direction, the second direction may be a −Z-axis direction, and when the first direction is the −Z-axis direction, the second direction may be the +Z-axis direction.

Thus, the second bending motion may bend the display device 100 in an opposite direction to the first direction. For example, when the first bending motion bends the display device 100 so as to make a screen of the display device 100 concave, the second bending motion may bend the display device 100 so as to make the screen convex.

The display device 100 may transmit predetermined content to the external device 200 that is selected by the user, according to the second bending motion (operation S950). In the present embodiment, the display device 100 may transmit the predetermined content to the external device 200 via short-distance communication (e.g., Bluetooth, NFC, WFD, UWB, ZigBee, Wi-Fi, or the like). In another embodiment, the display device 100 may transmit the predetermined content to the external device 200 via an external server.

The display device 100 may transmit the predetermined content to the external device 200 or may transmit link information of the predetermined content to the external device 200. Here, the link information means access information about a web site including the predetermined content. An example of the link information may include a uniform resource locator (URL), or the like.

Figure 14A:
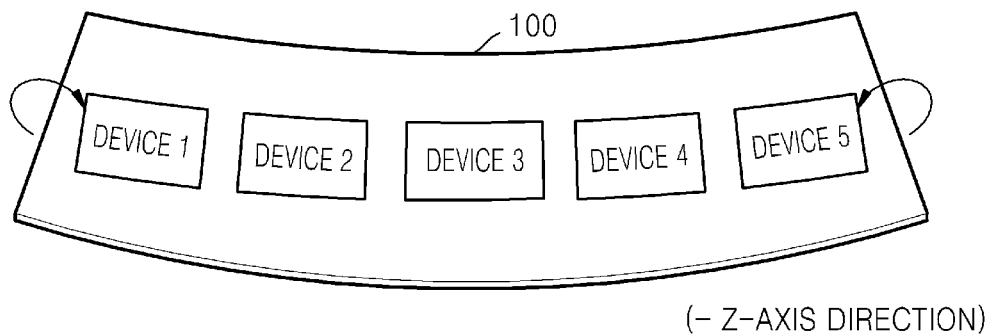
FIGS. 14A through 14C illustrate screens related to a method of transmitting content, according to another exemplary embodiment
Figure 14B:
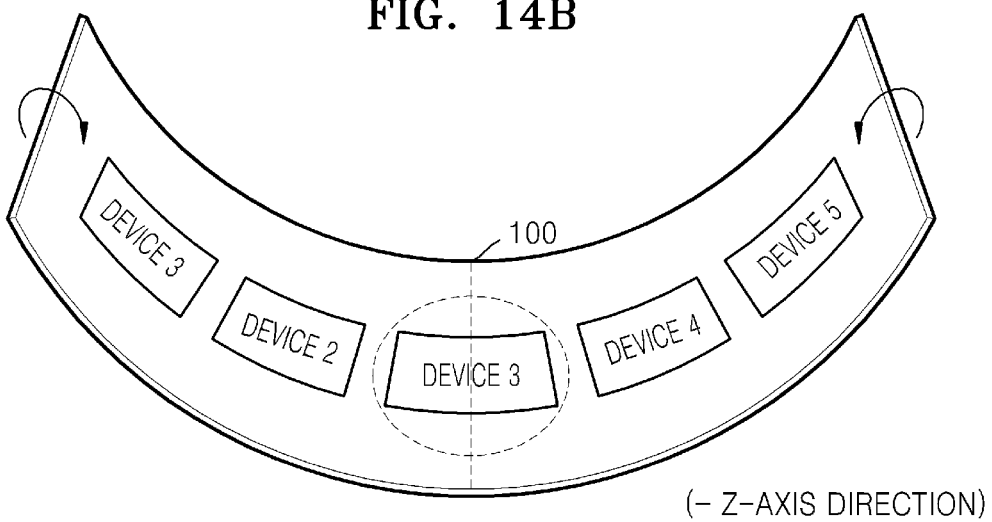
Figure 14C:
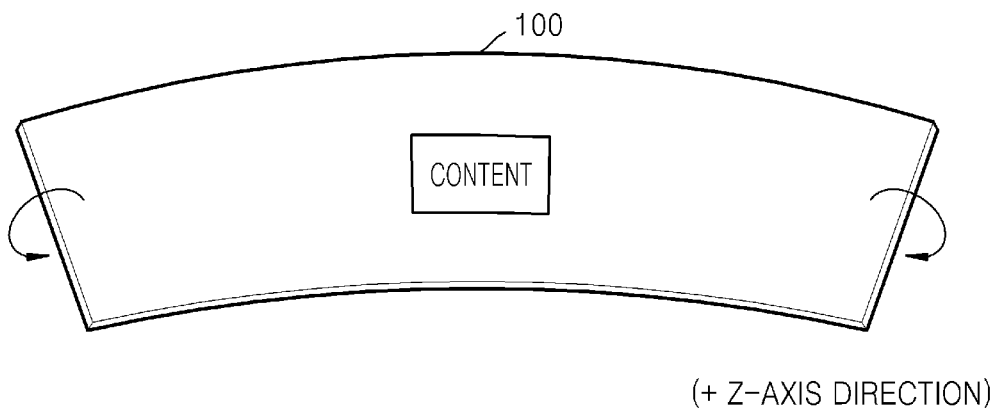

FIGS. 14A through 14C illustrate screens related to a method of transmitting content, according to another exemplary embodiment.

As illustrated in FIG. 14A, when a user bends the display device 100 so as to make a screen of the display device 100 concave (in a −Z-axis direction), the display device 100 may detect a first bending motion and then may display an external device list on the screen.

Here, the user may check the external device list and then may select the external device 200 that is a content reception device. For example, as illustrated in FIG. 14B, the user may concavely bend a position of the screen which displays a device 3 by a degree that is greater than a degree of bending of the first bending motion. In this case, the device 3 may be selected as a reception device.

Also, as illustrated in FIG. 14C, when the user bends the display device 100 so as to make the screen of the display device 100 convex (in a +Z-axis direction), the display device 100 may detect a second bending motion and then may transmit predetermined content to the device 3 that is selected by the user.

That is, according to the present embodiment, the user may simply transmit the predetermined content to the external device 200 via an intuitional bending motion that bounces the predetermined content in an outward direction.

Figure 15:
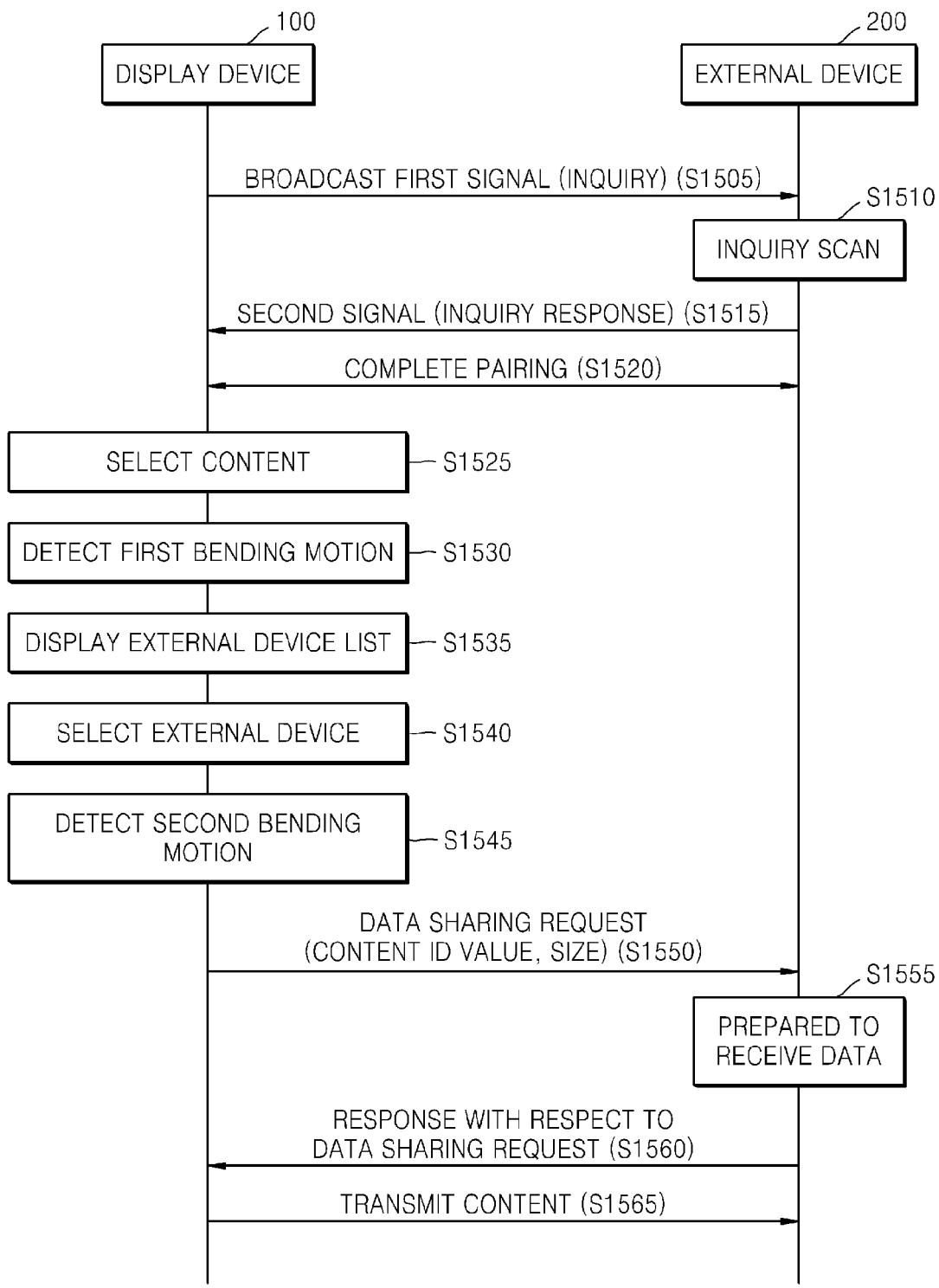
FIG. 15 is a flowchart of a method of transmitting content, according to another exemplary embodiment

FIG. 15 is a flowchart of a method of transmitting content, according to another exemplary embodiment.

In the present embodiment, the display device 100 may search for the external device 200 that is positioned within a predetermined distance. For example, the display device 100 may broadcast a first signal (i.e., an inquiry) once or at regular intervals so as to recognize the existence of the external device 200 (operation S1505) nearby the display device 100.

Here, the external device 200 that is positioned within a communication range of the display device 100 enters an inquiry scan status and then receives the first signal that is broadcast from the display device 100 (operation S1510).

The external device 200 that has received the first signal transmits a second signal (i.e., an inquiry response) to the display device 100, in response to the first signal (operation S1515). The display device 100 recognizes the external device 200, based on the second signal (i.e., the inquiry response) that is received from the external device 200.

In this case, the display device 100 may receive an address (e.g., a Bluetooth address), a service class, a major device class, a minor device class, clock information, a personal identification number (PIN) code, or the like that is related to the external device 200 from the external device 200, and then the display device 100 may be paired with the external device 200 (operation S1520). Here, the term 'pairing' means a status in which a mutual communication connection is allowed among a plurality of devices.

In the present embodiment, the display device 100 may generate an external device list by using a plurality of pieces of ID information about paired external devices. The external device list may be updated at regular intervals.

The display device 100 may select content to be transmitted to the external device 200, based on a user input (operation S1525). In the present embodiment, the user input may include at least one of a touch input, a bending input, a key input, a voice input, and a motion input. That is, the user may select the content by touching an area that displays the content to be transmitted to the external device 200 on a screen of the display device 100, by bending a portion of the display device 100 which displays the content, by controlling a direction key and a selection key, by speaking ID information (e.g., an ID, a content title, or the like) of the content, or by performing a predetermined motion.

In the present embodiment, the content to be transmitted to the external device 200 may be first selected by the user before the display device 100 and the external device 200 are paired. In another embodiment, after the display device 100 and the external device 200 are paired, the content to be transmitted to the external device 200 may be selected by the user.

In the present embodiment, the user may first select the external device 200 to receive content and then may select the content, or may first select content and then may select the external device 200 to receive the content.

Operations S1530 through S1545 correspond to operations S910 through S940 of the flowchart shown in FIG. 9, and thus, detailed descriptions thereof will be omitted here.

When the display device 100 detects a second bending motion that requests the external device 200 to receive content, the display device 100 may transmit a data sharing request to the external device 200 (operation S1550). The data sharing request may include information about content to be transmitted. For example, the data sharing request may include a plurality of pieces of information about a content title, a content type, a content ID value, a content size, a content metadata, content link information, or the like.

When the external device 200 receives the data sharing request, the external device 200 may display a GUI including icons of "Accept", "Ignore", or the like on a screen so as to allow a user to check information about the display device 100 or a transmitter, content information, and whether or not to permit connection.

When the user of the external device 200 selects the icon "Accept", the external device 200 is prepared to receive content (operation S1555). Then, the external device 200 transmits a response with respect to the data sharing request to the display device 100 (operation S1560).

In the present embodiment, the selection of the icon "Accept" or the icon "Ignore" may be performed by a bending gesture or a touch gestured by the user.

The display device 100 transmits the content to the external device 200 (operation S1565). In this case, according to the present embodiment, the display device 100 and the external device 200 may exchange data according to the DLNA specification or the UPnP specification.

In another embodiment, an order of operations S1505 through S1565 may be changed or some operations may be skipped.

Figure 16A:
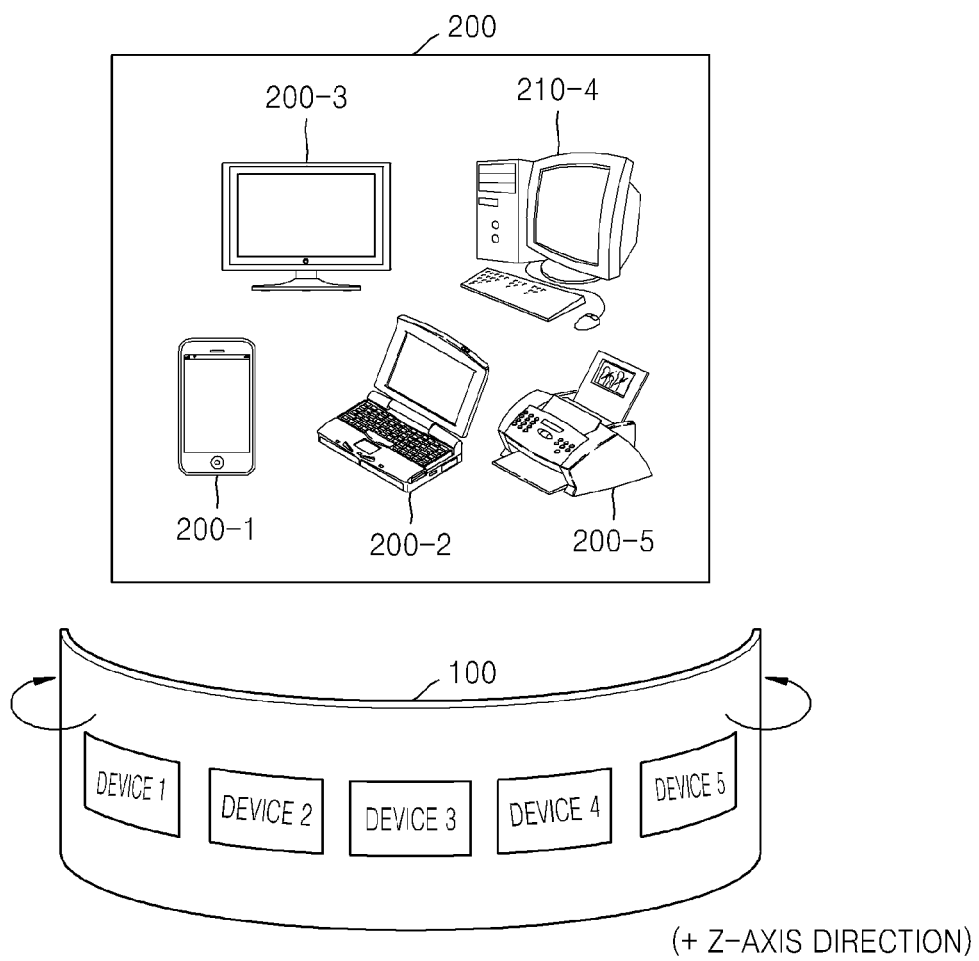
FIGS. 16A through 16C illustrate screens related to a method of transmitting content, according to another exemplary embodiment
Figure 16B:
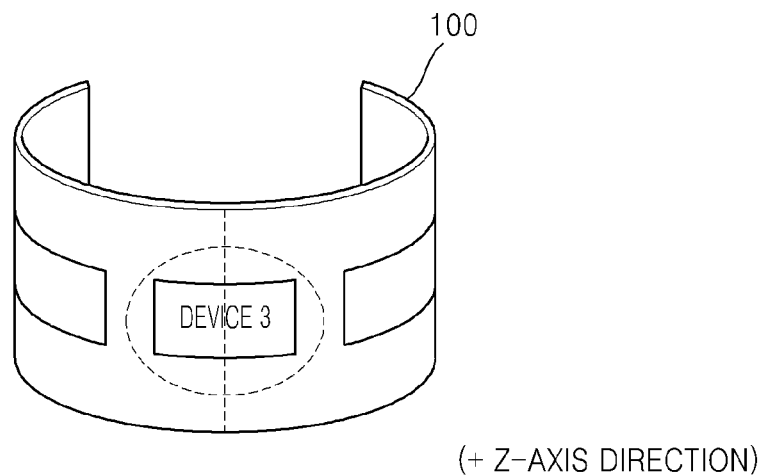
Figure 16C:
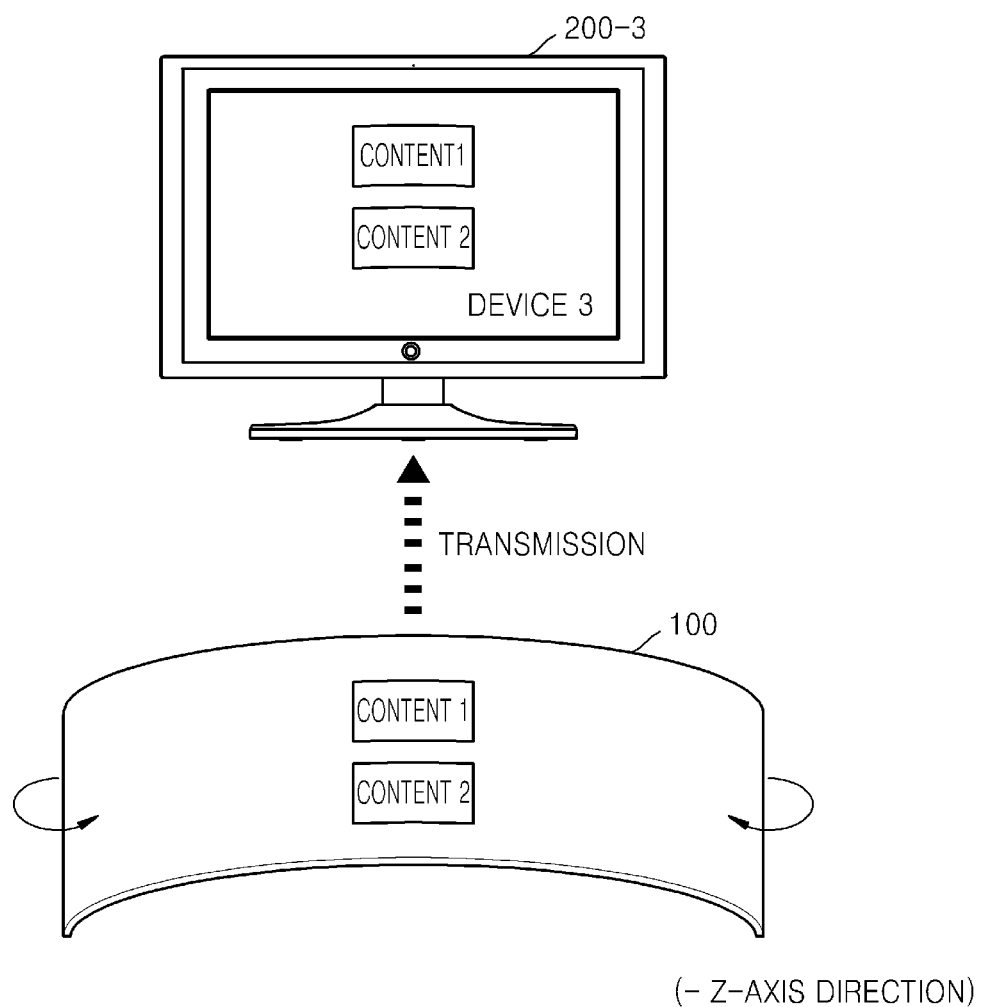

FIGS. 16A through 16C illustrates screens related to a method of transmitting content, according to another exemplary embodiment.

As illustrated in FIG. 16A, the display device 100 may search for external devices that are positioned within a predetermined distance, and may generate an external device list of the searched external devices.

When a first bending motion (e.g., the display device 100 is bent in a +Z-axis direction so that a screen of the display device 100 which faces a user becomes convex) that requests the external device list is detected, the display device 100 may display the external device list of the searched external devices on the screen.

As illustrated in FIG. 16B, the user may convexly (in the +Z-axis direction) bend a position of the external device list which indicates a device 3 200-3 by a degree that is greater than a degree of the first bending motion, so that the user may select the device 3 200-3 as a reception device.

As illustrated in FIG. 16C, when a second bending motion (e.g., the display device 100 is bent in a −Z-axis direction so that the screen of the display device 100 which faces the user becomes concave) that requests content transmission is detected, the display device 100 may transmit user-selected content to the device 3 200-3.

That is, according to the present embodiment, the user may select an external device by bending the screen of the display device 100 toward the user, and then may bend the screen of the display device 100 in a direction toward the external device, so that the display device 100 may transmit the content. Thus, the display device 100 may provide an intuitional UI for content transmission to the user.

Figure 17A:
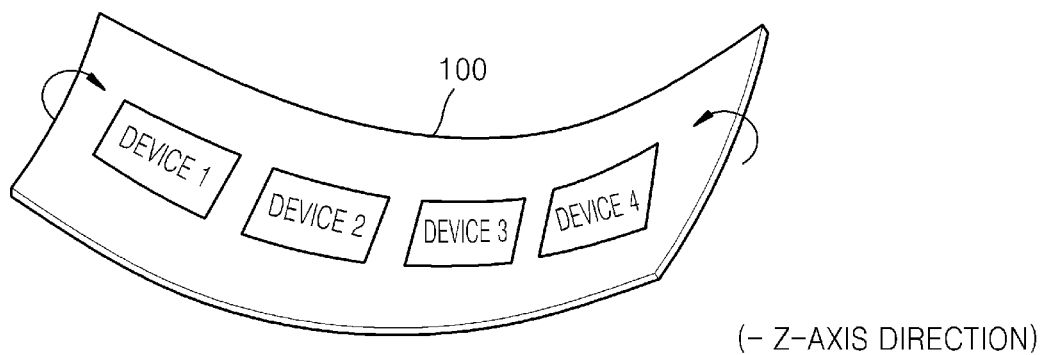
FIGS. 17A and 17B illustrates screens related to a method of transmitting content, according to another exemplary embodiment
Figure 17B:
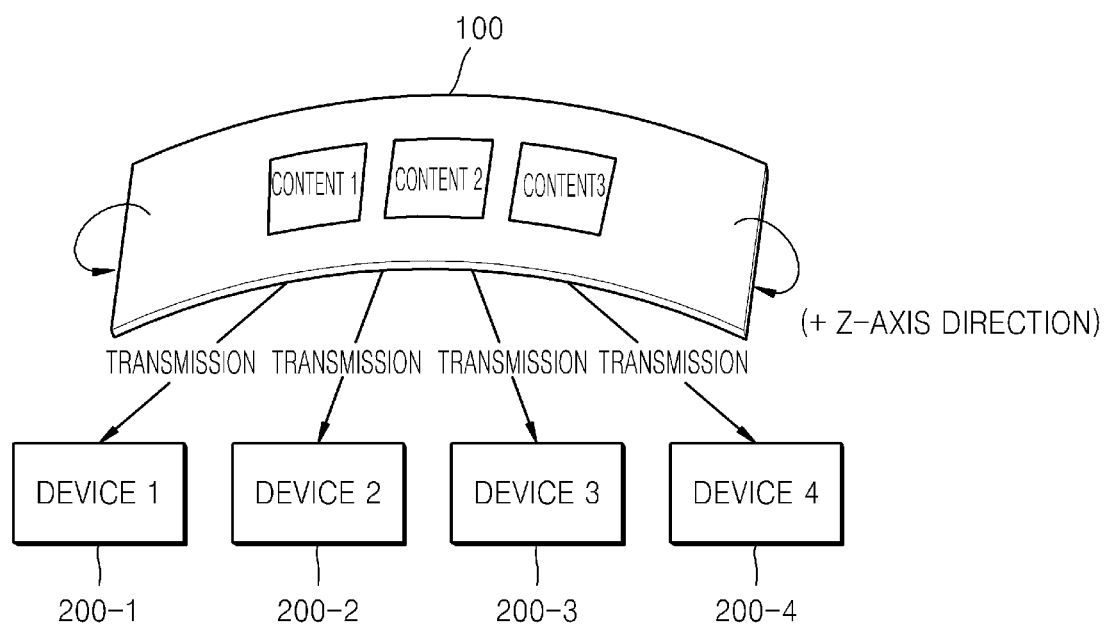

FIGS. 17A and 17B illustrate screens related to a method of transmitting content, according to another exemplary embodiment.

As illustrated in FIG. 17A, when a user bends the display device 100 so as to make a screen of the display device 100 concave, the display device 100 may detect a first bending motion and may display an external device list on the screen.

Here, the user may not select at least one external device from the external device list but may bend (a second bending motion) the display device 100 so as to make the screen of the display device 100 convex.

In this case, as illustrated in FIG. 17B, the display device 100 may determine that all of external devices 200-1, 200-2, 200-3, and 200-4 that are included in the external device list are selected and then may transmit predetermined content to all of the external devices 200-1, 200-2, 200-3, and 200-4.

Figure 18A:
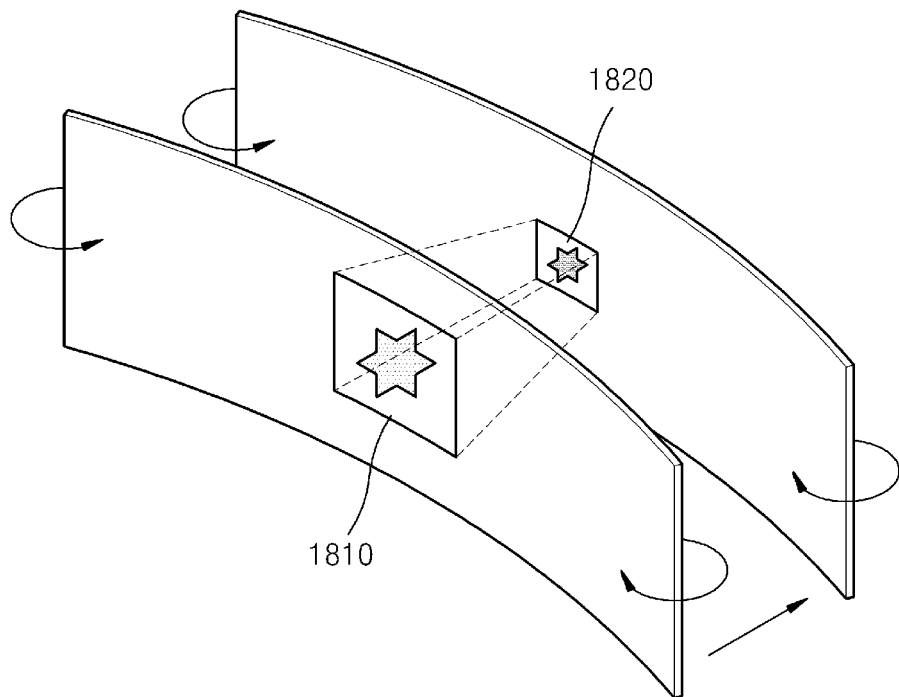
FIGS. 18A and 18B illustrate a graphic image that displays a transmission rate, according to an exemplary embodiment.
Figure 18B:
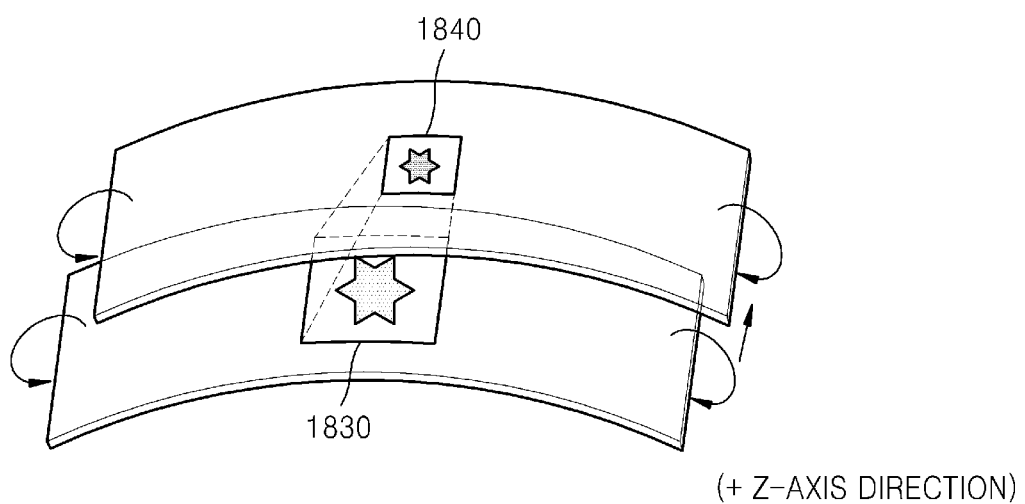

FIGS. 18A and 18B illustrate a graphic image that displays a transmission rate, according to an exemplary embodiment.

As illustrated in FIGS. 18A and 18B, while the display device 100 transmits predetermined content to the external device 200, the display device 100 may display a graphical image of a motion displaying that predetermined content is being transmitted. For example, the display device 100 may change a size of an image that corresponds to predetermined content and may display the image according to a transmission rate of the predetermined content.

As illustrated in FIG. 18A, in a case where a user transmits content to the external device 200 in a manner that the user holds the display device 100 so that a rear surface of the display device 100 faces the external device 200, bends the display device 100 toward the user so as to make a screen become convex, and then bends the display device 100 toward the external device 200 so as to make the screen become concave, the display device 100 may reduce a size of an image that corresponds to the content that is transmitted according to a transmission rate of the content and may display it on the screen (e.g., the image is stepwise changed from an image 1810 to an image 1820).

In this case, the user may easily recognize that the content is being transmitted to the external device 200, and may easily check the transmission rate of the content according to the size of the image that corresponds to the transmitted content.

As illustrated in FIG. 18B, in a case where the user holds the display device 100 so that the screen of the display device 100 faces upward, bends the display device 100 in a −Z-axis direction so as to make the screen become concave, and then bends the display device 100 in a +Z-axis direction so as to make the screen become convex, the display device 100 may reduce a size of an image that corresponds to content that is transmitted according to a transmission rate of the content and may display it on the screen. In this case, according to the present embodiment, the display device 100 may three-dimensionally display a graphical image in which the content outwardly bounces from the display device 100 (e.g., the image is stepwise changed from an image 1830 to an image 1840).

Hereinafter, a method of receiving, by the display device 100, content from the external device 200 based on an intuitional bending motion by a user will be described in detail with reference to FIG. 19. Here, it is assumed that a first application is a content management application for providing a content list or a content reproduction application for reproducing content, and a second application is at least one of a message application, a chatting application, an SNS application, and a short-distance communication application. That is, operations S1920 and S1930 may be performed via the first application, and operation S1950 may be performed via the second application.

Figure 19:
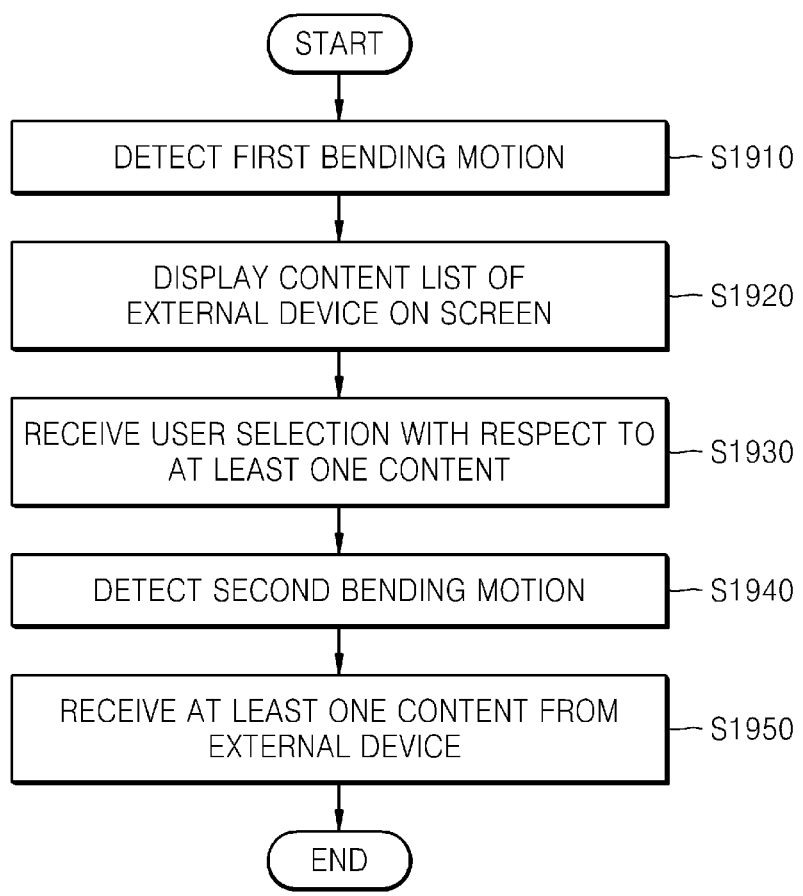
FIG. 19 is a flowchart of a method of receiving content, according to an exemplary embodiment.

FIG. 19 is a flowchart of a method of receiving content, according to an exemplary embodiment.

Referring to FIG. 19, the method includes operations that are processed in chronological order by the display device 100 shown in FIG. 2. Thus, hereinafter, although the above descriptions of the display device 100 shown in FIG. 2 are omitted, the descriptions may also be applied to the method of FIG. 19.

The display device 100 may detect a first bending motion that bends the display device 100 in a first direction (operation S1910). The first bending motion may be a bending motion that requests a content list of the external device 200.

The display device 100 may analyze a bended position (i.e., a bended line), a bending direction, a degree of bending, a bending strength, a bending speed, a total number of times the first bending motion occurs, a start time of the first bending motion, an elapsed-time of the first bending motion, or the like, so as to detect the first bending motion.

In the present embodiment, the first bending motion may include a motion that bends the display device 100 so as to make a rear surface of the display device 100, which faces the external device 200, become convex.

The display device 100 may display the content list of the external device 200 on a screen, based on the first bending motion (operation S1920). The content list may include ID information of at least one content that the external device 200 may provide to the display device 100.

The ID information of the content may be unique information that represents the content and may include, but is not limited to, a content title, a content ID, and a content image. The content that the external device 200 may provide to the display device 100 may include content that is stored in a memory of the external device 200, content that is stored in a cloud server, or the like.

In the present embodiment, the content may include moving picture content (e.g., a TV program image, VOD, a personal image such as UCC, a music video, a Youtube video, or the like), still image content (e.g., a photo, a picture, or the like), text content (e.g., an electronic book (poetry, novels, or the like), a letter, a work file, a web-page, or the like), music content (for example, music, radio broadcasting, or the like), an application (a widget, a game, or the like), and the like.

In the present embodiment, the display device 100 may display a plurality of pieces of ID information of a plurality of pieces of content included in the content list while the plurality of pieces of ID information appear from an outer side of the screen toward an inner side of the screen, according to the first bending motion. That is, the display device 100 may provide a graphical effect in which the plurality of pieces of content included in the content list appear from both ends of the screen along the screen that is concavely bent. In another embodiment, the display device 100 may provide a graphical effect in which the content list appears from one side (e.g., a right edge) of the screen and then moves toward another side (e.g., a left edge) of the screen.

According to the present embodiment, the display device 100 may receive a user selection with respect to at least one content included in the content list (operation S1930). That is, a user may check the displayed content list of the external device 200 and then may select the at least one content to be received from the external device 200.

In the present embodiment, the user may select the at least one content included in the content list of the external device 200, based on at least one of a bending input, a touch input, a voice input, a key input, and a motion input. That is, the user may bend a predetermined area of the display device 100, may touch a predetermined area of a touch screen, may press a predetermined key, may input a predetermined voice, or may perform a predetermined motion with respect to the display device 100, so that the user may select the at least one content.

An example of selecting the at least one content from the content list of the external device 200 will now be described with reference to FIGS. 20A through 20D.

FIGS. 20A through 20D illustrate screens related to selection of content based on a bending motion, according to an exemplary embodiment.

Figure 20A:
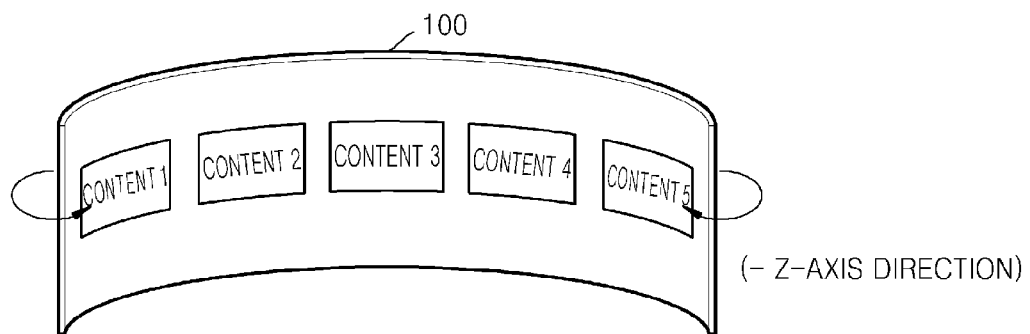
FIGS. 20A through 20D illustrate screens related to selection of content based on a bending motion, according to an exemplary embodiment.

As illustrated in FIG. 20A, when a user bends the display device 100 in a −Z-axis direction, the display device 100 may detect a first bending signal and then may display a content list of the external device 200 on a screen of the display device 100.

In this case, the user may select the content by bending (in the −Z-axis direction) an area of the content list by a degree that is greater than a degree of bending of a first bending motion, wherein the area of the content list displays the content to be received from the external device 200.

Figure 20B:
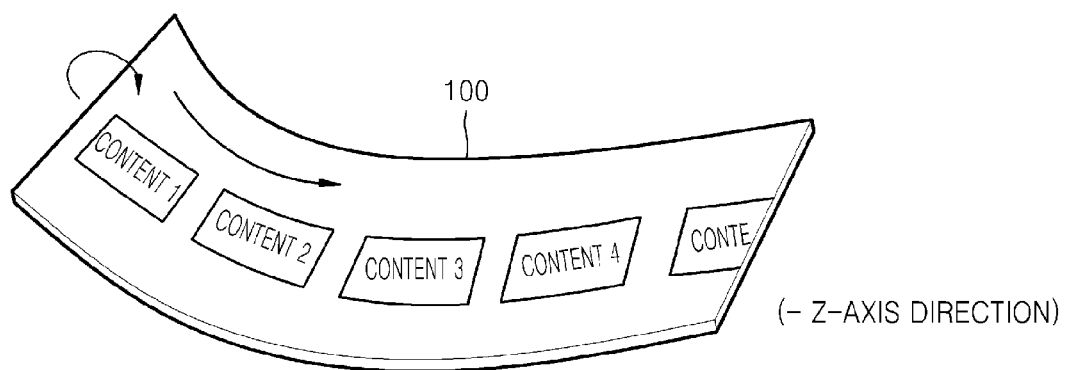
Figure 20C:
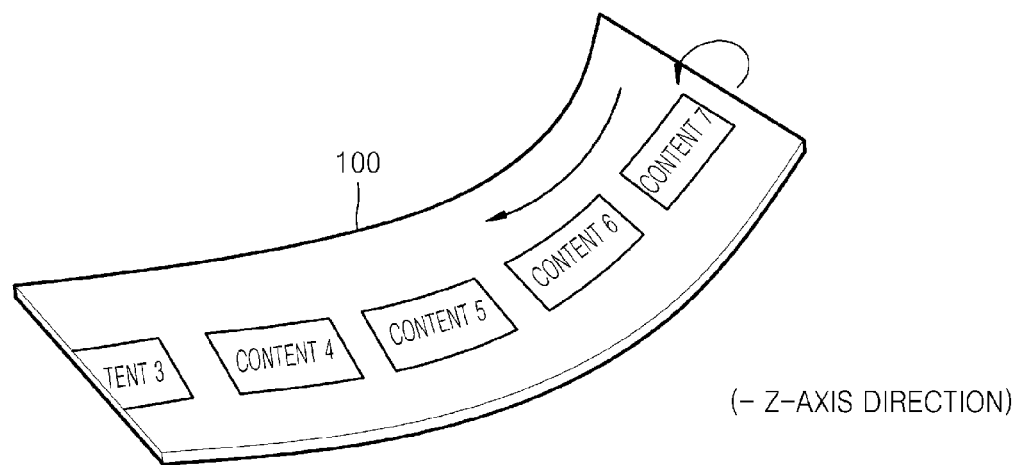

Alternatively, as illustrated in FIGS. 20B and 20C, the user may tilt the display device 100 in a status of the first bending motion in a left or right direction by at least a predetermined degree, so that the content to be received from the external device 200 may be disposed at a center area of the display device 100.

For example, as illustrated in FIG. 20B, when the user tilts the display device 100 such that the left side is raised as compared to the right side of the display device 100, the displayed list will scroll from left to right in a right direction, the display device 100 may scroll the content list and then may display ID information of content in the content list which is obstructed at a left side of the screen.

Also, as illustrated in FIG. 20C, when the user tilts the display device 100 such that the right side is raised as compared to the left side of the display device 100, the displayed list will scroll from right to left in a left direction, the display device 100 may scroll the content list and then may display ID information of content in the content list which is obstructed at a right side of the screen.

Figure 20D:
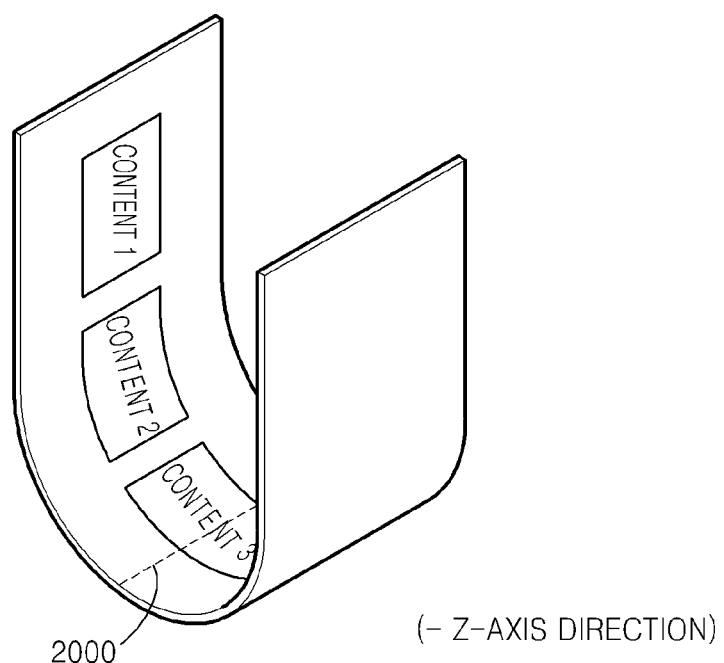

As illustrated in FIG. 20D, when the content (e.g., content 3) to be received from the external device 200 is disposed at the center area of the display device 100, the user may bend (in the −Z-axis direction) the center area of the display device 100 by a second degree of bending that is greater than a first degree of bending of the first bending motion, so that the user may select the content 3 as the content to be received from the external device 200.

Referring back to FIG. 19, the display device 100 may detect a second bending motion that bends the display device 100 in a second direction (operation S1940). In the present embodiment, the second direction may be opposite to a first direction of the first bending motion. For example, when the first direction is a +Z-axis direction, the second direction may be a −Z-axis direction, and when the first direction is the −Z-axis direction, the second direction may be the +Z-axis direction.

Thus, the second bending motion may bend the display device 100 in an opposite direction to the first bending motion. For example, when the first bending motion bends the display device 100 so as to make a rear surface of the display device 100, which faces the external device 200, become convex, the second bending motion may bend the display device 100 so as to make the rear surface of the display device 100, which faces the external device 200, become concave.

When the display device 100 detects the second bending motion, the display device 100 may receive user-selected content from the external device 200 (operation S1950). The display device 100 may receive the user-selected content from the external device 200 via short-distance communication (e.g., Bluetooth, NFC, WFD, UWB, ZigBee, Wi-Fi, or the like). In another embodiment, the display device 100 may receive the user-selected content from the external device 200 via an external server.

The display device 100 may receive the content from the external device 200 or may receive link information of the user-selected content from the external device 200. An example of the link information may include a URL, or the like.

Figure 21A:
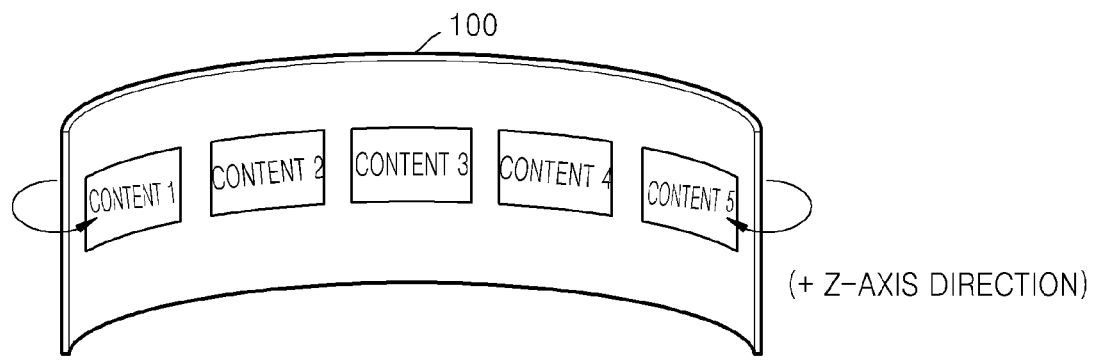
FIGS. 21A through 21C illustrates bending motions for receiving content, according to an exemplary embodiment.
Figure 21B:
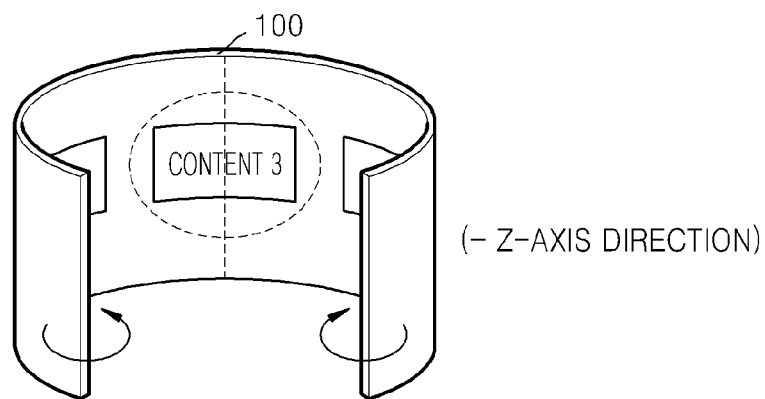
Figure 21C:
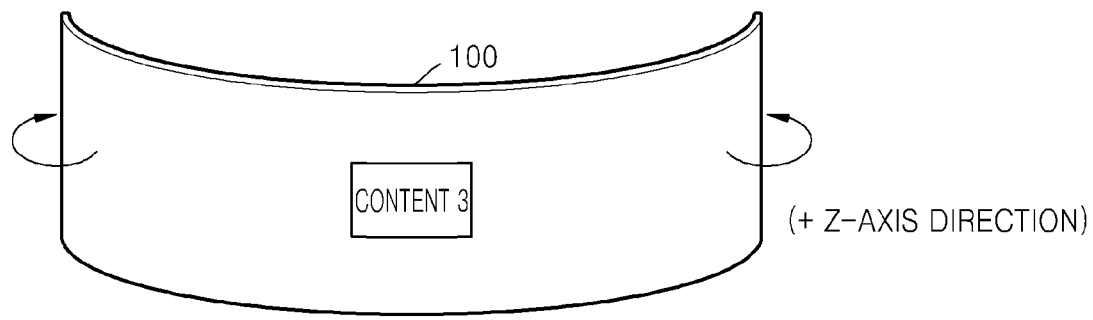

FIGS. 21A through 21C illustrate bending motions for receiving content, according to an exemplary embodiment.

As illustrated in FIG. 21A, a user may hold the display device 100 so that a rear surface of the display device 100 faces the external device 200, and then may bend the display device 100 so as to make the rear surface of the display device 100 become convex. In this case, the display device 100 may detect a first bending motion and then may display a content list of the external device 200.

As illustrated in FIG. 21B, the user may check the content list and may bend an area of the display device 100 by a second degree of bending that is greater than a first degree of bending of the first motion of bending, wherein the area the display device 100 displays ID information of content to be received from the external device 200. For example, when the user wants to select content 3, the user may bend an area of the display device 100 in a status of the first bending motion by a degree that is greater than the first degree of bending of the first bending motion, wherein the area of the display device 100 displays the content 3.

As illustrated in FIG. 21C, when the user bends the display device 100 so as to make the rear surface of the display device 100 concave, the display device 100 detects a second bending motion, requests user-selected content to the external device 200, and then receives the user-selected content.

That is, according to the present embodiment, the user may simply receive the user-selected content from the external device 200 by performing an intuitional bending motion that pulls the user-selected content toward the user.

FIG. 22 is a flowchart of a method of receiving content, according to an exemplary embodiment.

In the present embodiment, the external device 200 that is positioned within a predetermined distance from the display device 100 may broadcast a first signal (i.e., an inquiry) for content sharing (operation S2205).

In this case, the display device 100 that is positioned within a communication range of the external device 200 enters an inquiry scan status and then receives the first signal that is broadcast from the external device 200 (operation S2210).

In the present embodiment, when the display device 100 receives a first signal, the display device 100 may output an alarm signal. The alarm signal may include at least one of an audio signal, a video signal, and a vibration signal. That is, the display device 100 may inform the user that the external device 200 is detected within a communication range. Here, the display device 100 may output a confirm request message about whether to perform pairing with the external device 200 or whether to share content with the external device 200.

The display device 100 may transmit a second signal (i.e., an inquiry response) including ID information of the display device 100 to the external device 200, in response to the first signal (operation S2215). The ID information of the display device 100 may include a device ID, a device name, a MAC address, or the like.

In the present embodiment, the display device 100 may determine whether the rear surface of the display device 100 faces the external device 200, and according to a result of the determination, the display device 100 may transmit the second signal to the external device 200. That is, when the user holds the display device 100 so that the rear surface of the display device 100 faces the external device 200, the display device 100 may determine that the user wants to receive content from the external device 200, so that the display device 100 transmits the second signal to the external device 200. In the present embodiment, the display device 100 may determine whether the rear surface of the display device 100 faces the external device 200, by using a tilt sensor, a gyro sensor, a 3-axis magnetic sensor, or the like. This will now be described in detail with reference to FIG. 23.

Figure 23:
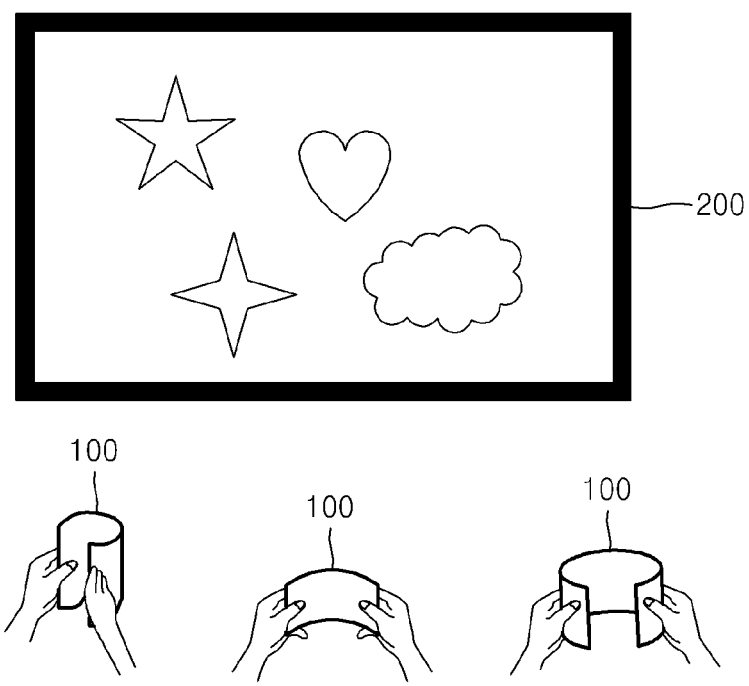
FIG. 23 illustrates a motion of receiving a first signal for content sharing from the external device and transmitting a second signal to the external device, according to an exemplary embodiment.

FIG. 23 illustrates a motion of receiving a first signal for content sharing from the external device 200 and transmitting a second signal to the external device 200, according to an exemplary embodiment.

As illustrated in FIG. 23, a user may make a rear surface of the display device 100 face the external device 200, and then may bend the display device 100 so as to make the rear surface of the display device 100 become convex toward the external device 200. In this case, the display device 100 may receive the first signal from the external device 200, and may transmit the second signal to the external device 200, in response to the first signal.

The display device 100 may be paired with the external device 200 by transmitting an address (e.g., a Bluetooth address), a service class, a major device class, a minor device class, clock information, a PIN code, or the like that is related to the display device 100 to the external device 200 (operation S2220).

When a communication link is formed (pairing) between the display device 100 and the external device 200, the display device 100 may receive a content list from the external device 200 via short-distance communication. The short-distance communication may include Bluetooth, NFC, WFD, UWB, ZigBee, Wi-Fi, or the like.

In the present embodiment, the display device 100 may select the external device 200 that is a content transmission device from an external device list, based on a user input (operation S2225). The user input may include at least one of a touch input, a bending input, a key input, a voice input, and a motion input. This will now be described in detail with reference to FIGS. 24A through 24C.

Figure 24A:
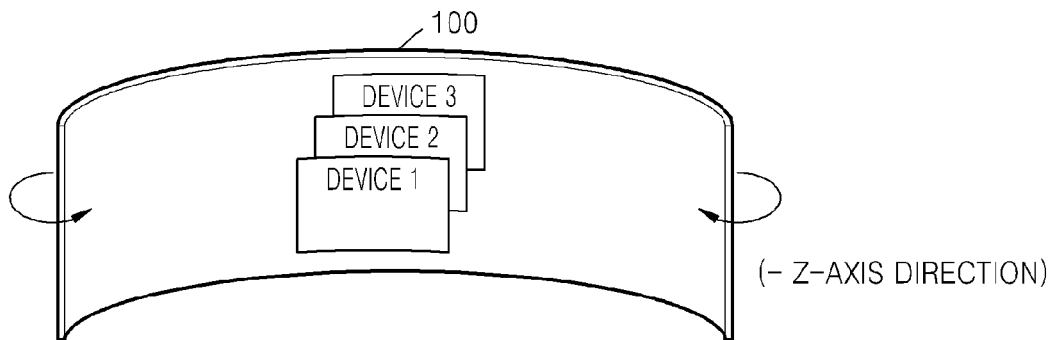
FIGS. 24A through 24C illustrate screens related to selection of an external device, according to an exemplary embodiment.
Figure 24B:
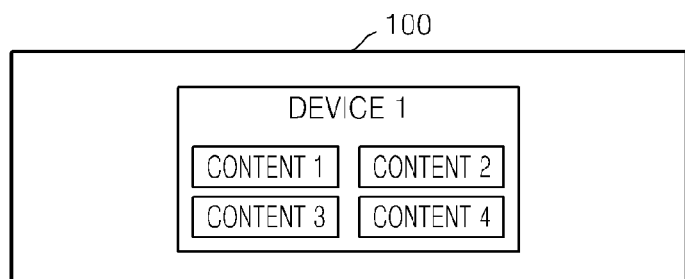
Figure 24C:
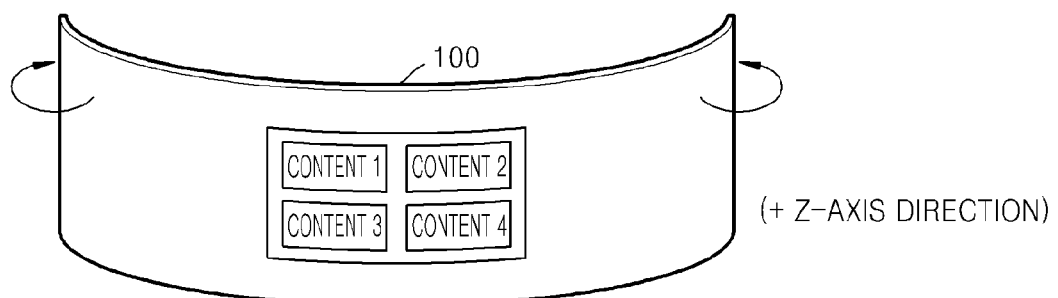

FIGS. 24A through 24C illustrate screens related to selection of an external device, according to an exemplary embodiment.

As illustrated in FIG. 24A, when a user bends the display device 100 so as to make a screen of the display device 100 concave, the display device 100 may display an external device list including external devices that are positioned within a predetermined distance on the screen. Here, when the user increases a degree of bending so as to make the screen of the display device 100 be further concave, ID information of an external device that is displayed foremost may be changed. For example, a device 1 may be displayed foremost at a first degree, a device 2 may be displayed foremost at a second degree that is greater than the first degree, and a device 3 may be displayed foremost at a third degree that is greater than the second degree.

As illustrated in FIG. 24B, when the user ends a bending motion (i.e., a degree of bending becomes 0) while the device 1 is displayed foremost, the display device 100 selects the device 1 as a transmission device. Thus, the display device 100 may receive a content list of the device 1 from the device 1 and may display the content list on the screen.

The user may select reception target content from the content list of the device 1. According to the present embodiment, the user may select the reception target content by touching ID information of the reception target content included in the content list, by bending a portion of the screen which displays the ID information of the reception target content, by controlling a direction key and a selection key, or the like.

As illustrated in FIG. 24C, when the user bends the display device 100 so as to make the screen of the display device 100 convex, the display device 100 receives the reception target content selected by the user from the device 1.

Operations S2230 through S2225 correspond to operations S1910 through S1940 of the flowchart shown in FIG. 19, and thus, detailed descriptions thereof will be omitted here.

When the display device 100 detects a second bending motion that requests content, the display device 100 may request the external device 200 to transmit content (operation S2250). The content transmission request may include an ID value of user-selected content, or the like. The external device 200 may transmit the user-selected content to the display device 100 (operation S2255), in response to the content transmission request (operation S2250).

In the present embodiment, while the display device 100 receives predetermined content from the external device 200, the display device 100 may display a graphical image of a motion displaying that the predetermined content is being received from the external device 200 (operation S2260). For example, the display device 100 may change a size of an image that corresponds to predetermined content and may display the image according to a reception rate of the predetermined content. This will now be described with reference to FIG. 25.

Figure 25:
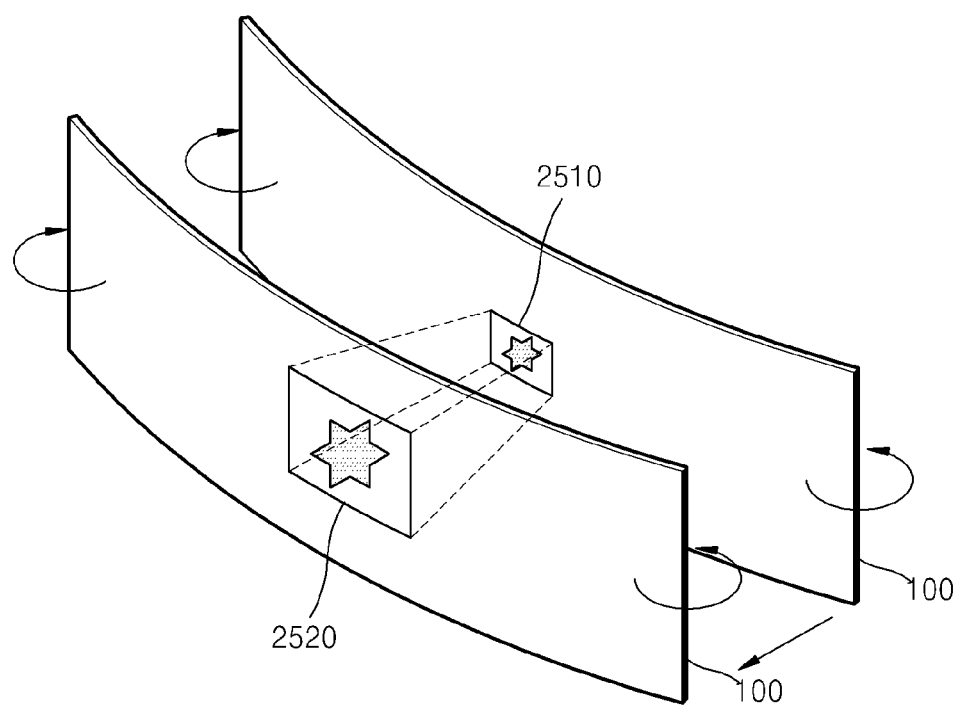
FIG. 25 illustrates a graphic image that displays a reception rate, according to an exemplary embodiment.

FIG. 25 illustrates a graphic image that displays a reception rate, according to an exemplary embodiment.

As illustrated in FIG. 25, in a case where a user receives content from the external device 200 in a manner that the user holds the display device 100 so that a rear surface of the display device 100 faces the external device 200, bends the display device 100 toward the external device 200 so as to make the rear surface of the display device 100 become convex, and then bends the display device 100 toward the user so as to make the rear surface of the display device 100 become concave, the display device 100 may increase a size of an image that corresponds to the content that is received according to a reception rate of the content and may display the image on a screen of the display device 100 (e.g., the image is stepwise changed from an image 2510 to an image 2520). In this case, the user may easily recognize that the content that is selected by the user is being received from the external device 200, and may easily check the reception rate of the content according to the size of the image that corresponds to the received content.

Figure 26A:
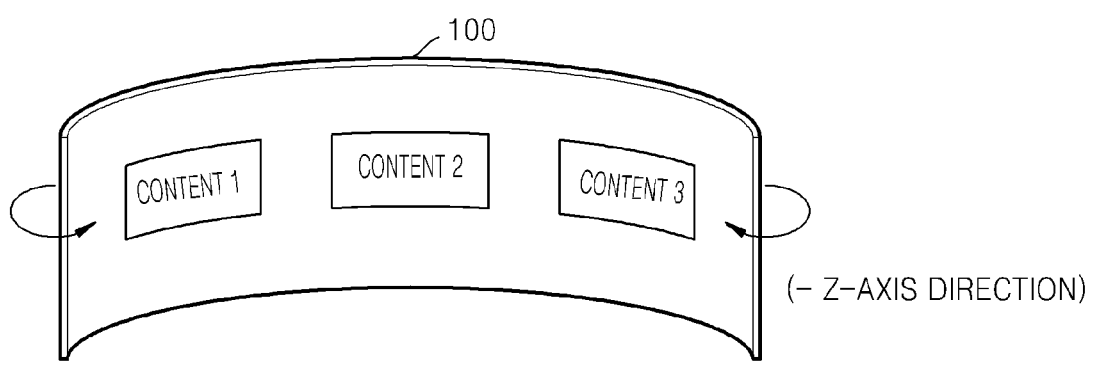
FIGS. 26A and 26B illustrate bending motions for receiving content, according to another exemplary embodiment.
Figure 26B:
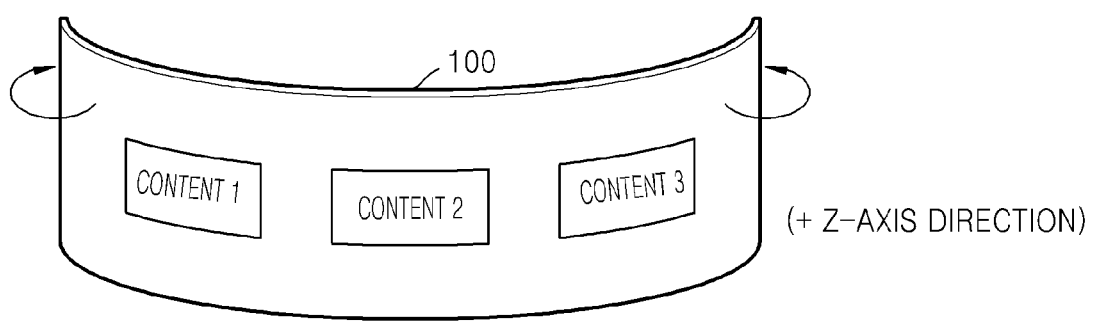

FIGS. 26A and 26B illustrate bending motions for receiving content, according to another exemplary embodiment.

As illustrated in FIG. 26A, when a user holds the display device 100 so that a rear surface of the display device 100 faces the external device 200, and then bends the display device 100 toward the external device 200 so as to make the rear surface of the display device 100 become convex, the display device 100 may detect a first bending motion and may display a content list on a screen of the display device 100.

Here, as illustrated in FIG. 26B, when the user does not select content from the content list but bends the display device 100 toward the user so as to make the rear surface of the display device 100 become concave, the display device 100 may determine that all pieces of content included in the content list are selected, so that the display device 100 may receive all of the pieces of content included in the content list from the external device 200.

In another embodiment, when the user bends the display device 100 toward the user so as to make the rear surface of the display device 100 become concave while the user touches specific content in the content list, the display device 100 may recognize the specific content where a user's hand is located and then may receive the rest of content other than the specific content from the external device 200.

Figure 27:
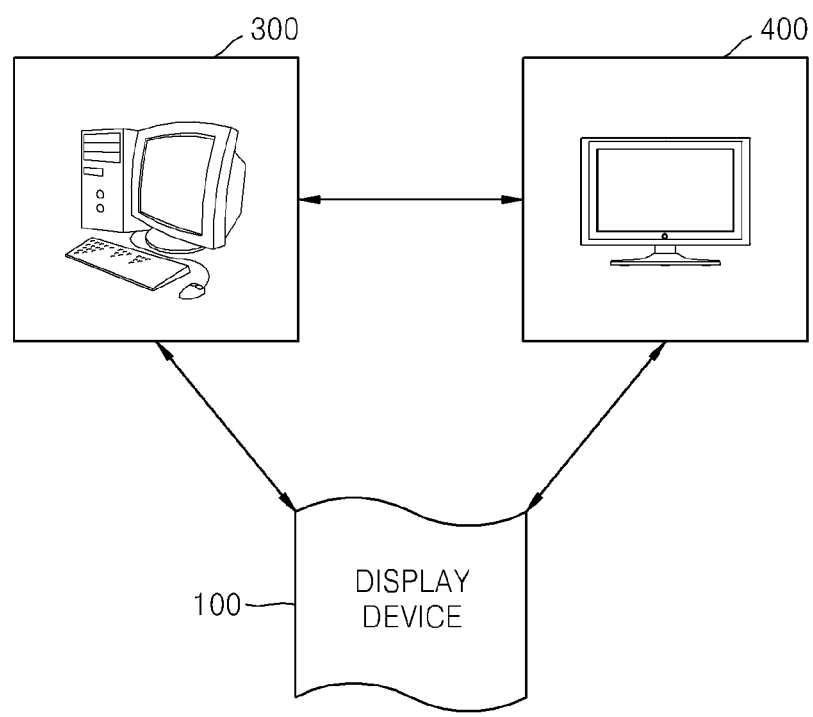
FIG. 27 illustrates a control system, according to an exemplary embodiment.

FIG. 27 illustrates a control system, according to an exemplary embodiment.

As illustrated in FIG. 27, the control system may include the display device 100, a first device 300, and a second device 400.

The display device 100 may control the first device 300 and the second device 400 so as to control content sharing between the first device 300 and the second device 400. Detailed descriptions about the display device 100 are provided above with reference to FIG. 2, and thus, detailed descriptions thereof will be omitted here.

The first device 300 and the second device 400 may communicate with each other and may display content. The first device 300 and the second device 400 may correspond to various types of a device that includes a display panel. For example, throughout the specification, the first device 300 and the second device 400 may include a mobile phone, a smart phone, a laptop computer, a tablet PC, an electronic book terminal, a smart TV, a terminal for digital broadcasting, a PDA, a PMP, a navigation device, or the like.

In the present embodiment, the first device 300 may be a transmission device that transmits content, and the second device 400 may be a reception device that receives content.

Hereinafter, a method of controlling, by the display device 100, content sharing between first device 300 and the second device 400 will be described in detail with reference to FIG. 28.

Figure 28:
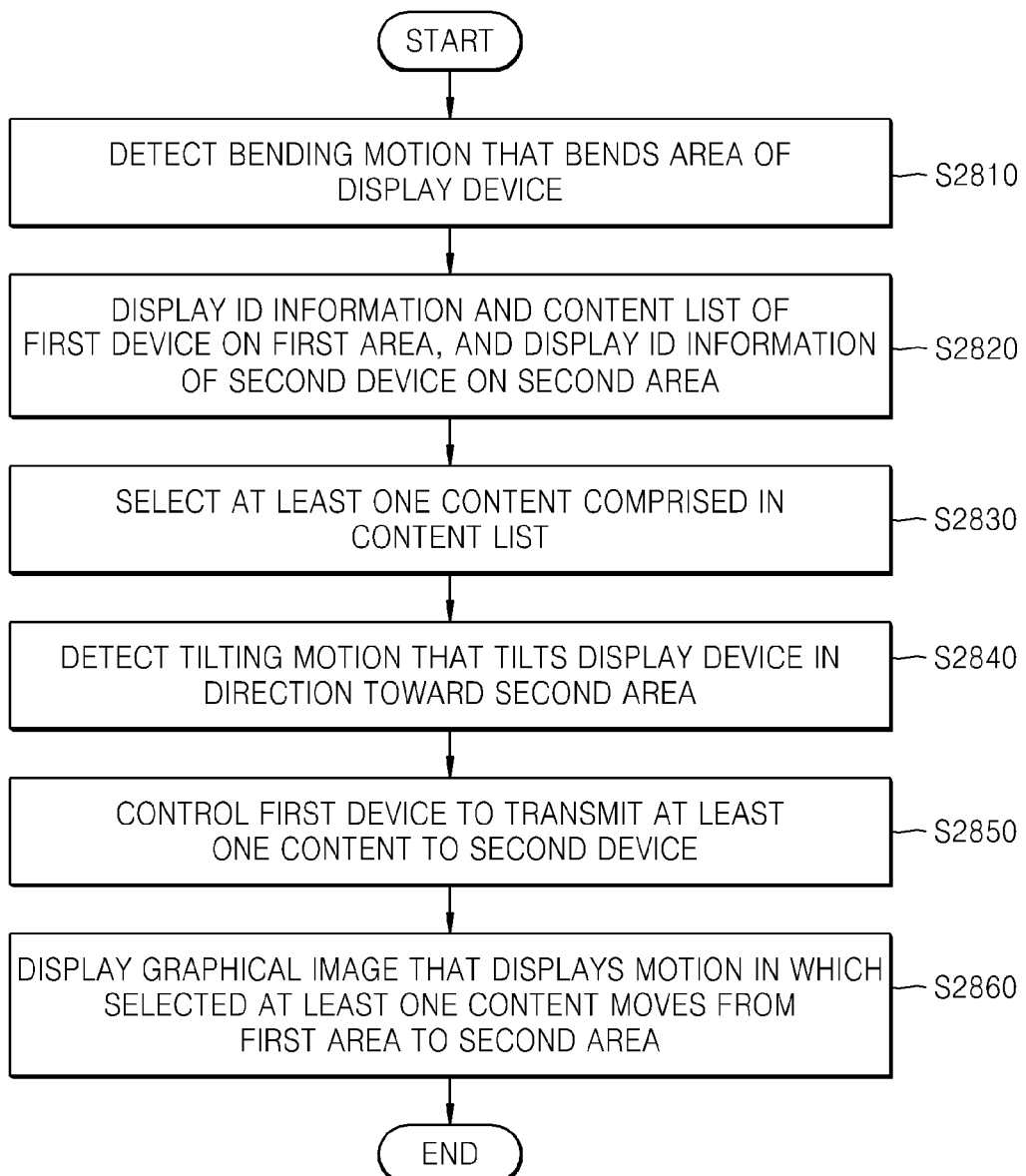
FIG. 28 is a flowchart of a method of controlling content sharing, according to an exemplary embodiment.

FIG. 28 is a flowchart of a method of controlling content sharing, according to an exemplary embodiment.

In the present embodiment, the display device 100 may detect a bending motion that bends an area of the display device 100 (operation S2810). For example, the display device 100 may detect a motion that bends a first area of a screen of the display device 100 so as to make the first area become convex. Also, the display device 100 may detect a motion that bends a second area of the screen of the display device 100 so as to make the second area become concave.

In the present embodiment, the display device 100 may display ID information of the first device 300 and a content list of the first device 300 on the first area of the screen, and may display ID information of the second device 400 on the second area of the screen, based on the bending motion that bends the area of the display device 100 (operation S2820). In the present embodiment, ID information of a device may mean unique information of the device and may include a device ID, a device name, a MAC address, an ID image (e.g., an icon), or the like.

The display device 100 may request the content list to the first device 300 and then may directly receive the content list from the first device 300, or may receive the content list of the first device 300 from an external server.

When the first area becomes convex in response to the bending motion, the display device 100 may display the content list with the content list of the first device 300 appearing from a lower end of the first area toward an upper end of the first area.

In the present embodiment, when the second area becomes concave in response to the bending motion, the display device 100 may display the ID information of the second device 400 on the concave second area.

The display device 100 may select at least one content from the content list displayed on the first area, according to a user input (operation S2830). In the present embodiment, the user input may include at least one of a touch input, a bending input, a key input, and a voice input.

That is, the user may select the at least one content by touching an area of the content list which displays the at least one content, by bending the area that displays the at least one content, by using a direction key and a selection key, or by inputting a voice command.

The display device 100 may detect a motion that tilts the display device 100 by at least a predetermined degree in a direction toward the second area (operation S2840). In the present embodiment, the display device 100 may detect the motion that tilts the display device 100 by at least the predetermined degree, by using a tilt sensor, a gyro sensor, a 3-axis magnetic sensor, or the like.

Based on the tilting motion, the display device 100 may control the first device 300 to transmit the at least one content to the second device 400 (operation S2850).

The display device 100 may transmit a control command to the first device 300 so as to control the first device 300 to transmit the at least one content to the second device 400. In the present embodiment, the control command may include information about the at least one content and information about the second device 400. The information about the at least one content may include a content ID value, a content name, or the like. The information about the second device 400 may include a device ID, a device name, a MAC address, position information, an available communication method, or the like.

In another embodiment, the display device 100 may receive the at least one content from the first device 300 and then may transmit the at least one content to the second device 400.

When the at least one content is transmitted from the first device 300 to the second device 400, the display device 100 may display a graphical image on the screen, wherein the graphical image displays a motion in which the at least one content moves from the first area to the second area (operation S2860). In the present embodiment, the display device 100 may display a graphical image in which the at least one content falls from the convexly-bent first area to the second area, based on the motion that tilts the display device 100 by at least the predetermined degree. This will now be described in detail with reference to FIGS. 29 and 30.

Figure 29A:
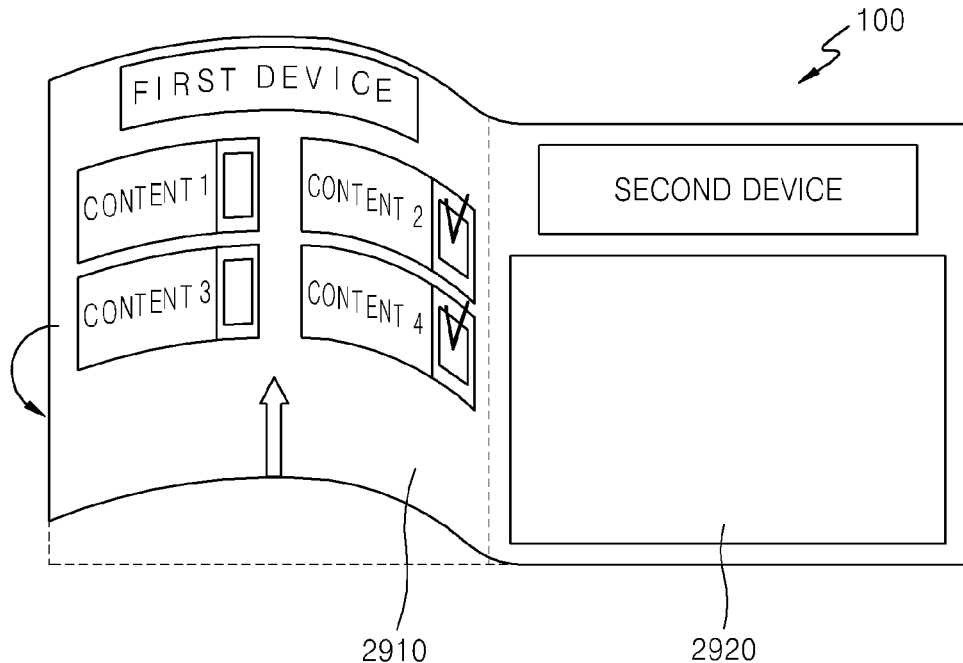
FIGS. 29A and 29B illustrate graphical images that display transmission of content, according to an exemplary embodiment.
Figure 29B:
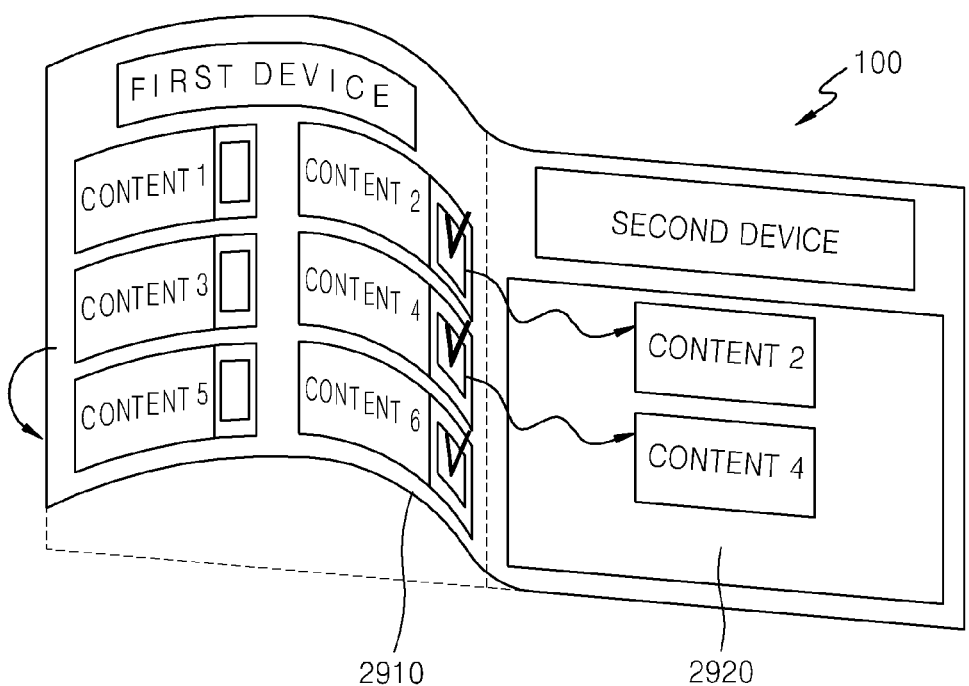

FIGS. 29A and 29B illustrate graphical images that display transmission of content, according to an exemplary embodiment.

For convenience of description, it is assumed that a user selects the first device 300 as a transmission device and selects the second device 400 as a reception device from a controllable device list.

As illustrated in FIG. 29A, the user may bend a first area 2910 that displays ID information of the first device 300, so as to make the first area 2910 become convex. In this case, the display device 100 may detect a motion that convexly bends the first area 2910, and may display a content list of the first device 300 in a direction from a lower end toward an upper end of the first area 2910. Here, the user may select at least one content to be transmitted to the second device 400, from a content list that is displayed on the convexly-bent first area 2910.

The user may select the at least one content by bending or touching an area of the content list which displays the at least one content, by speaking an ID value of the at least one content, or by deforming the display device 100 to a predetermined form. For example, the user may select content 2 and content 4 as content to be transmitted to the second device 400, wherein the content 2 and the content 4 are from among content 1 through content 6 included in the first device 300.

As illustrated in FIG. 29B, when the user tilts the display device 100 toward the second device 400, the display device 100 may control the first device 300 to transmit the content 2 and the content 4 of the first device 300 to the second device 400.

Also, when the content 2 and the content 4 are transmitted, the display device 100 may display a graphical image in which an image corresponding to the content 2 and an image corresponding to the content 4 fall from the convexly-bent first area 2910 to a second area 2920.

Thus, in the present embodiment, the user may control content sharing between external devices, based on a simple bending motion and a simple tilting motion. For example, the user may easily transmit a file stored in a computer to a digital TV (DTV), by bending an area of the display device 100 and then tilting the display device 100.

Figure 30A:
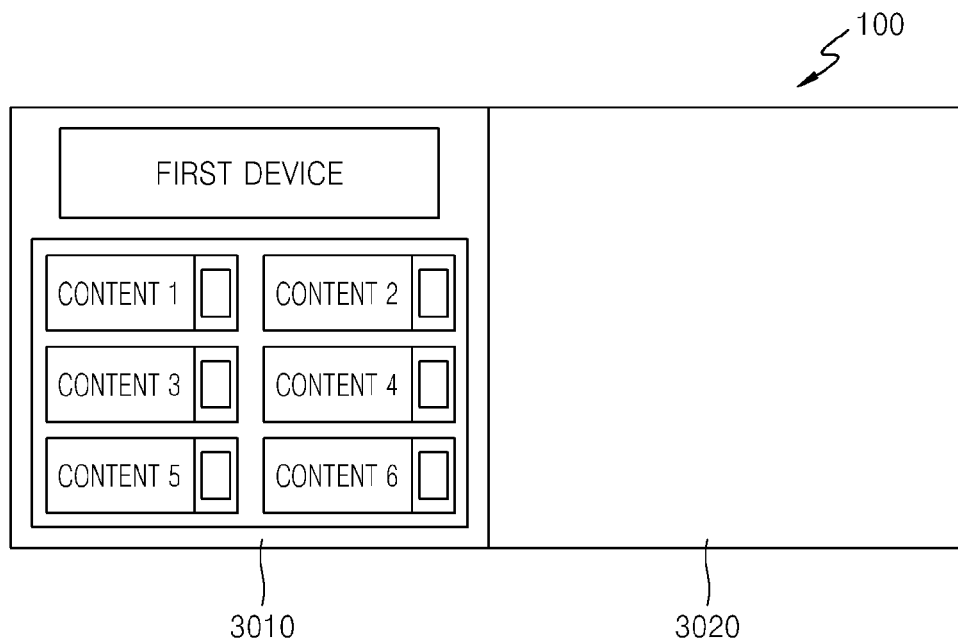
FIG. 30A through 30C illustrate graphical images that display transmission of content, according to another exemplary embodiment.
Figure 30B:
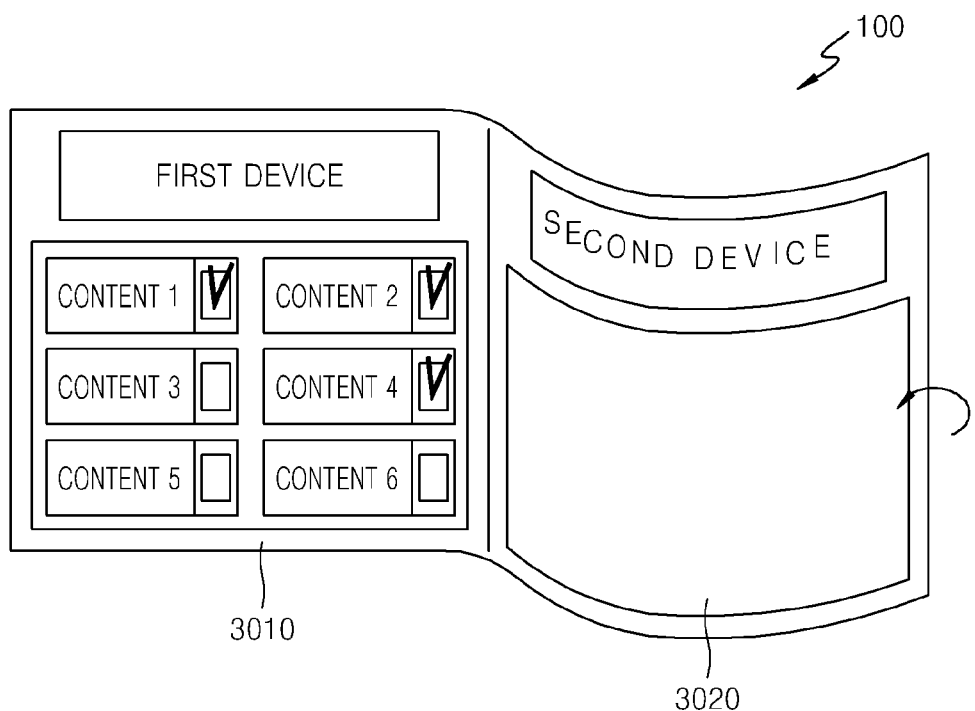
Figure 30C:
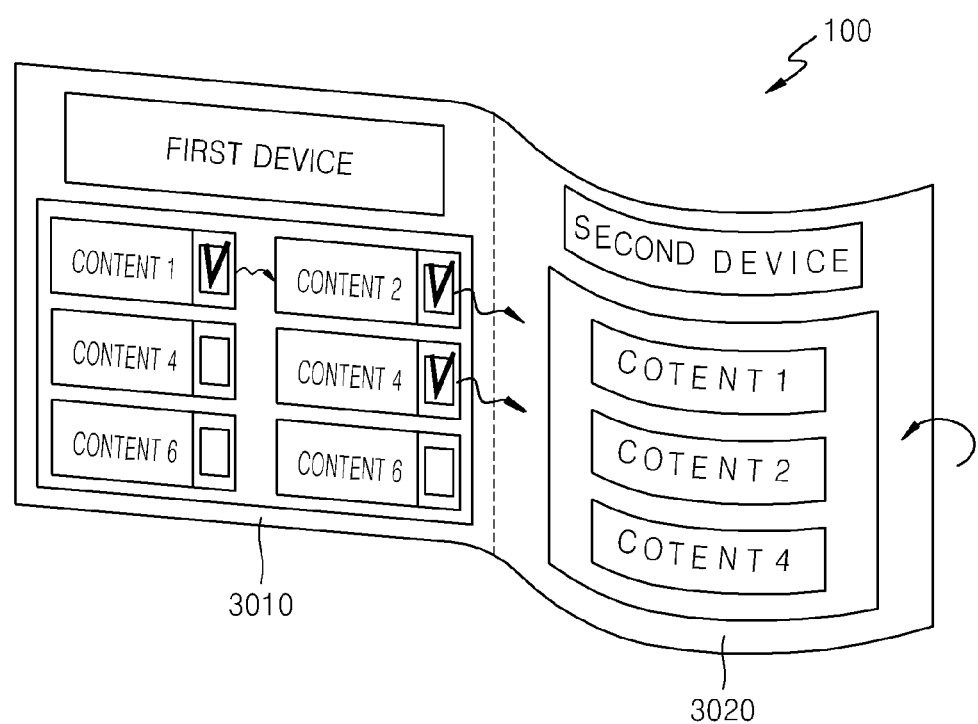

FIG. 30A through 30C illustrate graphical images that display transmission of content, according to another exemplary embodiment.

As illustrated in FIG. 30A, the display device 100 may display ID information of the first device 300 and a content list of the first device 300 on a first area 3010. In this case, a user may check the content list of the first device 300 and then may select at least one content to be transmitted to the second device 400.

The user may select the at least one content by bending or touching an area of the content list which displays the at least one content, by speaking an ID value of the at least one content, or by deforming the display device 100 to a predetermined form. For example, the user may select content 1, content 2, and content 4 as content to be transmitted to the second device 400, wherein the content 1, the content 2 and the content 4 are from among content 1 through content 6 included in the first device 300.

As illustrated in FIG. 30B, the user may bend a second area 3020 of the display device 100 so as to make the second area 3020 become concave. In this case, the display device 100 may detect a bending motion in which the second area 3020 becomes concave and then may display ID information of the second device 400 on the second area 3020.

As illustrated in FIG. 30C, when the user tilts the display device 100 toward the second area 3020, the display device 100 may control the first device 300 to transmit the content 1, the content 2, and the content 4 to the second device 400.

Also, when the content 1, the content 2, and the content 4 are transmitted, the display device 100 may display a graphical image in which an image corresponding to the content 1, an image corresponding to the content 2, and an image corresponding to the content 4 move (fall) from the first area 3010 to an empty space of the second area 3020 that is concavely bent.

FIG. 31 is a flowchart of a method of controlling content sharing, according to another exemplary embodiment.

In the present embodiment, the display device 100 may request control authority from the first device 300 (operation S3105) and may be authenticated with respect to the control authority by the first device 300 (operation S3110). Also, the display device 100 may request control authority from the second device 400 (operation S3115) and may be authenticated with respect to the control authority by the second device 400 (operation S3120). In this case, the first device 300 and the second device 400 may be devices that are controllable via the display device 100.

In the present embodiment, the display device 100 may display a controllable device list on a screen of the display device 100 (operation S3125). The user may check the controllable device list, may select the first device 300 as a transmission device, and may select the second device 400 as a reception device (operation S3130).

The display device 100 may request a content list to the first device 300 that is selected as the transmission device (operation S3135). In this case, the first device 300 may provide a content list to the display device 100, wherein the content list includes a plurality of pieces of content that can be transmitted to the second device 400 (operation S3140). In another embodiment, operations 3135 through 3140 may be skipped, and in this regard, when the display device 100 is authenticated with respect to the control authority by the first device 300, the display device 100 may receive the content list.

Because operations S3145 through S3160 correspond to operations S2810 through S2840 of the flowchart of FIG. 28, detailed descriptions thereof will be omitted here.

In the present embodiment, the display device 100 may display ID information of the first device 300 and a content list of the first device 300 on a first area of a screen, and may display ID information of the second device 400 on a second area of the screen, based on the bending motion that bends the area of the display device 100.

In response to a motion that tilts the display device 100 by at least a predetermined degree in a direction toward the second area, the display device 100 may transmit a control command to the first device 300 so as to control the first device 300 to transmit content to the second device 400 (operation S3165).

In this case, the first device 300 may transmit a data sharing request to the second device 400 (operation S3170). The data sharing request may include information (e.g., a content ID value, a content size, or the like) about content to be transmitted by the first device 300.

The second device 400 that has received the data sharing request is prepared to receive data (operation S3175). Then, the second device 400 transmits a response to the data sharing request to the first device 300 (operation S3180). In this case, the first device 300 may transmit the content that is selected by the user to the second device 400 (operation S3185).

When the user-selected content is transmitted from the first device 300 to the second device 400, the display device 100 may display a graphical image about a motion in which an image corresponding to the user-selected content moves from the first area to the second area (operation S3190).

In another embodiment, an order of operations S3105 through S3190 may be changed or some operations may be skipped.

FIG. 32 is a flowchart of a method of controlling content sharing, according to another exemplary embodiment.

Because operations before operation S3210 correspond to operations S3105 through S3155 of the flowchart of FIG. 31, (detailed descriptions about the operations before operation S3210 will be omitted here.

When the display device 100 detects a motion that tilts the display device 100 toward the second area which display ID information of the second device 400 (operation S3210), the display device 100 may transmit a data sharing request to the second device 400 (operation S3220). The data sharing request may include information (e.g., a content ID value, a content size, or the like) about content.

The second device 400 that has received the data sharing request is prepared to receive data (operation S3230). Then, the second device 400 transmits a response to the data sharing request to the display device 100 (operation S3240).

The display device 100 may request the first device 300 to transmit user-selected content to the display device 100 (operation S3240) (operation S3250). In this case, the first device 300 transmits the user-selected content to the display device 100 (operation S3260). The display device 100 that has received the user-selected content from the first device 300 may transmit the received user-selected content to the second device 400 (operation S3270). Also, when the user-selected content is transmitted to the second device 400, the display device 100 may display a graphical image of a motion in which an image corresponding to the user-selected content moves from the first area which display ID information of the first device 300 and a content list of the first device 300 to the second area (operation S3280).

In another embodiment, an order of operations S3210 through S3280 may be changed, and some operations may be skipped.

According to the one or more exemplary embodiments, the user may easily transmit and receive content via a simple bending motion. Thus, the display device according to the one or more embodiments may provide an intuitional user interface by which the content may be easily exchanged with the external device.

The invention may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for the present invention or may be well known to one of ordinary skill in the art. Examples of the computer-readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), flash memory, and the like. Examples of the programmed commands include not only machine codes generated by a compiler but also include great codes to be executed in a computer by using an interpreter. The hardware apparatus may be configured to function as one or more software modules so as to perform operations of the invention, or vice versa.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of executing an application performed by a display device, the method comprising:
   detecting a first motion that bends the display device in a first direction to deform the display device into a first form;
   displaying an external device list on a screen of the display device, based on the first motion;
   receiving a selection of at least one external device comprised in the external device list;
   detecting a second motion that bends the display device in a second direction to deform the display device into a second form; and
   transmitting predetermined content to the at least one external device using an application, based on the second motion,
   wherein the application is operable to display a content list comprising a plurality of contents of an external apparatus on the screen, receive a user selection with respect to at least one content included in the content list, and receive the at least one content from the external apparatus using the application.

2. The method of claim 1, wherein the second direction is different from the first direction and the second form is different from the first form.

3. The method of claim 1, wherein the executing the application comprises recommending and displaying the application.

4. The method of claim 3, wherein the executing the application further comprises:
   providing an application list comprising a plurality of applications;
   receiving a selection of at least one application comprised in the application list; and
   executing the at least one application.

5. The method of claim 1, wherein the executing the application comprises:
   executing at least one of a message application, a chatting application, a social network service (SNS) application, and a short-distance communication application, so as to transmit the predetermined content to the at least one external device.

6. The method of claim 1, wherein the displaying the external device list comprises:
   searching for one or more external devices that are positioned within a predetermined distance from the display device; and
   displaying a list of found one or more external devices on the screen.

7. The method of claim 1, wherein the displaying the external device list comprises:
   displaying identification (ID) information of the at least one external device comprised in the external device list so that the ID information appears from an outer side of the screen toward an inner side of the screen, based on the first motion.

8. The method of claim 1, wherein the receiving the selection of the at least one external device comprises:
   detecting a third motion that bends an area of the display device that is already deformed into the first form, by at least a predetermined degree into a bended position; and
   selecting an external device that corresponds to the bended position of the third motion.

9. The method of claim 7, wherein the receiving the selection of the at least one external device comprises:
   receiving a user input that moves the ID information of the at least one external device comprised in the external device list to a center area of the screen.

10. The method of claim 9, wherein the receiving the selection of the at least one external device comprises:
    detecting a tilting motion that tilts the display device that is already deformed into the first form, by at least a predetermined degree; and
    scrolling the ID information of the at least one external device comprised in the external device list, based on a tilting direction and a degree of tilt of the tilting motion.

11. The method of claim 1,
    wherein the first form comprises the display device being bent so that the screen is concave, and
    wherein the second form comprises the display device being bent so that the screen is convex.

12. The method of claim 1, further comprising selecting content to be transmitted to the at least one external device, based on a user input.

13. The method of claim 12, wherein the user input comprises at least one of a touch input, a bending input, a key input, a voice input, and a motion input.

14. The method of claim 1, wherein the transmitting the predetermined content comprises changing a size of an image corresponding to the predetermined content, based on a transmission rate of the predetermined content, and then displaying the image on the screen.

15. The method of claim 1, wherein the displaying of the external device list comprises changing an arrangement order in the external device list, based on a degree of bending of the first motion.

16. The method of claim 15, wherein the transmitting the predetermined content comprises transmitting the predetermined content to an external device that is positioned at a top of the external device list, in response to the detecting the second motion.

17. The method of claim 1, wherein the displaying the content list comprises:
receiving a first signal for content sharing from the external apparatus that is positioned within a predetermined distance from the display device;
transmitting a second signal comprising identification (ID) information of the display device to the external apparatus, in response to the first signal; and
receiving a content list from the external apparatus via short-distance communication via a communication link formed between the display device and the external apparatus based on the second signal.

18. The method of claim 17, wherein the receiving of the first signal further comprises outputting an alarm signal when the first signal is received.

19. The method of claim 18, wherein the alarm signal comprises at least one of an audio signal, a video signal, and a vibration signal.

20. The method of claim 17, wherein the transmitting the second signal comprises:
determining whether a rear surface of the display device faces the external apparatus; and
transmitting the second signal to the external apparatus based on a result of the determining.

21. The method of claim 1, wherein the receiving the user selection comprises:
detecting a third motion that bends, the display device that is already deformed into the first form, by at least a predetermined degree into a bended position; and
selecting content that corresponds to the bended position of the third motion.

22. The method of claim 1, further comprising selecting the external apparatus based on a user input.

23. The method of claim 22, wherein the selecting the external apparatus comprises:
detecting a fourth motion that displays an external apparatus list; and
changing an arrangement order in the external apparatus list, based on a degree of bending of the fourth motion.

24. The method of claim 1, wherein the executing the application comprises:
changing a size of an image corresponding to the at least one content, based on a reception rate of the at least one content, and
displaying the image with the changed size on the screen.

25. The method of claim 1,
further comprising an address book application that displays the external device list, and
wherein the executing the application comprises:
executing a communication application that communicates with the at least one external device based on the second motion.

26. The method of claim 1,
further comprising:
executing a content management application that displays a content list of an external apparatus on the screen of the display device, based on the first motion; and receiving a user selection with respect to at least one content comprised in the content list, and
wherein the executing the application comprises:
executing a backup application that backs up the at least one content in an external server based on the second motion.

27. A display device for executing an application, the display device comprising:
a user input unit configured to detect a first motion that bends the display device in a first direction to deform the display device into a first form, and detect a second motion that bends the display device in a second direction to deform the display device into a second form; and
a control unit configured to control a display unit to display an external device list on a screen in response to the first motion being detected, configured to receive a selection of at least one external device comprised in the external device list via the user input unit and configured to control a communication unit to transmit predetermined content to the at least one external device using an application in response to the second motion being detected,
wherein the application is operable to display a content list comprising a plurality of contents of an external apparatus on the screen, receive a user selection with respect to at least one content included in the content list, and receive the at least one content from the external apparatus using the application.

28. The display device of claim 27, wherein the second direction is different from the first direction and the second form is different from the first form.

29. The display device of claim 27, wherein the control unit is configured to determine the application.

30. The display device of claim 29,
wherein the display unit is further configured to provide an application list comprising a plurality of applications,
wherein the user input unit is further configured to receive a selection of at least one application comprised in the application list, and
wherein the control unit is further configured to execute the at least one application.

31. The display device of claim 27, wherein the control unit is configured to execute at least one of a message application, a chatting application, a social network service (SNS) application, and a short-distance communication application so as to transmit the predetermined content to the at least one external device.

32. The display device of claim 27, wherein the communication unit is further configured to search for one or more external devices that are positioned within a predetermined distance from the display device, and
wherein the display unit is further configured to display a list of the searched one or more external devices on the screen.

33. The display device of claim 27, wherein the display unit is configured to display identification (ID) information of the at least one external device comprised in the external device list so that the ID information appears from an outer side of the screen toward an inner side of the screen is response to the first motion being detected.

34. The display device of claim 27, wherein the user input unit is configured to detect a third motion that bends an area of the display device, that is already deformed into the first form, by at least a predetermined degree into a bended position, and the control unit is configured to select an external device that corresponds to the bended position of the third motion.

35. The display device of claim 27, wherein the user input unit is configured to receive a user input that moves the identification (ID) information of the at least one external device comprised in the external device list to a center area of the screen.

36. The display device of claim 35,
wherein the user input unit comprises a motion recognition module configured to detect a tilting motion that tilts the display device, that is already deformed into the first form, by at least a predetermined degree, and
wherein the control unit is configured to scroll the ID information of the at least one external device comprised in the external device list, based on a tilting direction and a degree of tilt of the tilting motion.

37. The display device of claim 27,
wherein the first form comprises a form in which a screen of the display device is bent to be concave, and
wherein the second form comprises a form in which a screen of the display device is bent to be convex.

38. The display device of claim 27, wherein the control unit is configured to select content to be transmitted to the at least one external device based on a user input.

39. The display device of claim 38, wherein the user input comprises at least one of a touch input, a bending input, a key input, a voice input, and a motion input.

40. The display device of claim 27, wherein the display unit is configured to change a size of an image corresponding to the predetermined content, based on a transmission rate of the predetermined content, and then displays the image on the screen.

41. The display device of claim 27, wherein the control unit is configured to change an arrangement order in the external device list, based on a degree of bending of the first motion.

42. The display device of claim 41, wherein the communication unit is configured to transmit the predetermined content to an external device that is positioned at a top of the external device list, in response to the second motion being detected.

43. The display device of claim 27, wherein the communication unit is configured to:
receive a first signal for content sharing from the external apparatus that is positioned within a predetermined distance from the display device;
transmit a second signal comprising identification (ID) information of the display device to the external apparatus, in response to the first signal; and
receive a content list from the external apparatus via short-distance communication via a communication link formed between the display device and the external apparatus based on the second signal.

44. The display device of claim 43, wherein the display unit is configured to output an alarm signal, when the first signal is received.

45. The display device of claim 43, wherein the control unit is configured to:
determine whether a rear surface of the display device faces the external apparatus, and
control the communication unit to transmit the second signal to the external apparatus based on a result of the determination.

46. The display device of claim 27,
wherein the user input unit is configured to detect a third motion that bends the display device that is already deformed into the first form, by at least a predetermined degree into a bended position, and
wherein the control unit is configured to select content that corresponds to the bended position of the third motion.

47. The display device of claim 27, wherein the control unit is configured to select the external apparatus based on a user input.

48. The display device of claim 27, wherein the display unit is configured to change a size of an image corresponding to the at least one content, based on a reception rate of the at least one content, and then displays the image on the screen.

49. The display device of claim 27,
further comprising an address book application that displays the external device list, and
wherein the control unit is further configured to execute a communication application that communicates with at least one user-selected external device comprised in the external device list in response to the control unit detecting the second motion.

50. The display device of claim 27,
wherein the control unit is configured to execute a content management application that displays a content list of an external apparatus on the screen of the display device in response to the control unit detecting the first motion, and
wherein the control unit is configured to execute a backup application that backs up at least one user-selected content, that is comprised in the content list, in an external server in response to the control unit detecting the second motion.

51. A non-transitory computer-readable recording medium having recorded thereon a program for executing the method of claim 1.

* * * * *